(12) United States Patent
Kumar et al.

(10) Patent No.: US 12,481,418 B1
(45) Date of Patent: Nov. 25, 2025

(54) END-TO-END WORKSPACE ARCHITECTURE TO COLLABORATIVELY MODEL CONFIGURABLE SERVICE OUTCOMES

(71) Applicant: Sequoia Benefits and Insurance Services, LLC, San Mateo, CA (US)

(72) Inventors: Indrajeet Kumar, Foster City, CA (US); Anand Kulkarni, Bangalore (IN); Ruth Buel, Sunnyvale, CA (US); Martina Lendova Huamonte, Aldie, VA (US); Maya Louise Estrada, Richmond, CA (US); Marie Priastuti Hadiatmodjo Kennedy, Jackson Heights, NY (US); Cloe Ann Czepiel, Durham, CT (US)

(73) Assignee: Sequoia Benefits and Insurance Services, LLC, San Mateo, CA (US)

( * ) Notice: Subject to any disclaimer, the term of this patent is extended or adjusted under 35 U.S.C. 154(b) by 0 days.

(21) Appl. No.: 19/215,196

(22) Filed: May 21, 2025

(30) Foreign Application Priority Data

Mar. 28, 2025 (IN) .............................. 202541030050

(51) Int. Cl.
   *G06F 3/0484*   (2022.01)
   *G06F 9/451*    (2018.01)
   *G06F 9/54*     (2006.01)

(52) U.S. Cl.
   CPC ............ *G06F 3/0484* (2013.01); *G06F 9/451* (2018.02); *G06F 9/543* (2013.01)

(58) Field of Classification Search
   CPC .......... G06F 3/0484; G06F 9/451; G06F 9/543
   See application file for complete search history.

(56) References Cited

U.S. PATENT DOCUMENTS

| 5,752,236 A   | * | 5/1998  | Sexton   | G06Q 40/10 |
|               |   |         |          | 708/163    |
| 10,535,104 B1 | * | 1/2020  | Mitchell | G06Q 40/08 |
| 10,802,746 B1 | * | 10/2020 | Lazier   | G06F 3/0604 |

(Continued)

FOREIGN PATENT DOCUMENTS

| CA | 2769994 A1 | 9/2012  |
| CA | 3095629 A1 | 10/2019 |

(Continued)

*Primary Examiner* — Daniel W Parcher
(74) *Attorney, Agent, or Firm* — Lowenstein Sandler LLP

(57) ABSTRACT

An interactive data object (IDO) is generated by a software-as-a-service (SaaS) management platform responsive to a first client request from a client device. A second client request identifying user-defined IDO data for the IDO is received from the client device. The user-defined IDO data is related to a subscriber entity and one or more previous services consumed by the subscriber entity via the SaaS management platform. A contained IDO is determined based on the user-defined IDO data and contained data related to one or more new services for consumption by the subscriber entity. The contained IDO is configured to model first outcomes corresponding to the one or more new services provided by one or more third-party services providers based on one or more parameters. A notification indicating that first information pertaining to the IDO and the contained IDO is provided to an end user device.

16 Claims, 28 Drawing Sheets

(56) References Cited

U.S. PATENT DOCUMENTS

| | | | |
|---|---|---|---|
| 11,170,450 B1* | 11/2021 | Magoon | G16H 10/60 |
| 11,790,470 B1* | 10/2023 | Wolter | G06F 40/174 |
| | | | 726/30 |
| 12,032,918 B1 | 7/2024 | Garvey | |
| 12,080,430 B1* | 9/2024 | Boisjolie | G16H 50/20 |
| 2003/0046112 A1* | 3/2003 | Dutta | G06Q 40/08 |
| | | | 705/3 |
| 2014/0222469 A1* | 8/2014 | Stahl | G06Q 40/08 |
| | | | 705/4 |
| 2018/0300647 A1 | 10/2018 | Blue | |
| 2021/0073290 A1 | 3/2021 | Hunter | |
| 2022/0188949 A1* | 6/2022 | Mulligan | G06Q 50/18 |
| 2022/0327226 A1 | 10/2022 | Rich | |
| 2022/0391381 A1* | 12/2022 | Thimbleby | G06F 16/275 |
| 2023/0050034 A1 | 2/2023 | Ben-Elazar | |
| 2025/0094690 A1 | 3/2025 | DeCharms | |
| 2025/0200208 A1 | 6/2025 | Roper, Jr. | |
| 2025/0217114 A1 | 7/2025 | Roper, Jr. | |

FOREIGN PATENT DOCUMENTS

| | | |
|---|---|---|
| CA | 3178485 A1 | 11/2021 |
| CA | 3068185 C | 11/2023 |
| WO | 2014144749 A1 | 9/2014 |
| WO | 2015159131 A1 | 10/2015 |
| WO | 2024145209 A1 | 7/2024 |
| WO | 2025043184 A2 | 2/2025 |
| WO | 2025080963 A1 | 4/2025 |

\* cited by examiner

FIG. 3A

< BACK

Employees

① Enrollments ② Benefit Group ③ Quoted Plans ④ Plan Mapping ⑤ Additional Cost Optional ⑥ Collaborators Optional ( Medical  Dental  Vision ) }306

}304

🔍 Search by name...

Showing 25 of 205 entries

| Employee Name | Home Location | Plan Name | Benefit Group | Department | Coverage Level | Employment Type | No. of Dependents | Monthly Employer Cost | Monthly Employee Cost |
|---|---|---|---|---|---|---|---|---|---|
| (AM) AARON @xy.com | H, GA | HSA3200 | PRIMARY | Field Sales | EE + Family | Full Time | 3 | $2,966.68 | $741.67 |
| (AP) ALEXIS P. @xy.com | A, NY | -- | PRIMARY | Field Sales | Waived | Full Time | -- | $0.00 | $0.00 |
| (AP) AMOL P. @xy.com | S, NY | -- | PRIMARY | Quality | Waived | Full Time | -- | $0.00 | $0.00 |
| (AS) ANKUR S. @xy.com | B, -- | -- | PRIMARY | Marketing | Waived | Full Time | -- | $0.00 | $0.00 |
| (BC) BARBARA C. @xy.com | G, PA | -- | PRIMARY | Field Sales | Waived | Full Time | -- | $0.00 | $0.00 |
| (BH) BERNARD H. bernard@xy.com | R, NJ | -- | PRIMARY | Field Sales | Waived | Full Time | -- | $0.00 | $0.00 |
| (BC) BRIAN C. | C, PA | HSA3200 | PRIMARY | Field Sales | EE + Family | Full Time | 5 | $2,966.68 | $741.67 |

< BACK

Confirm Benefit Group

① Enrollments  ② Benefit Group  ③ Quoted Plans  ④ Plan Mapping  ⑤ Additional Cost Optional  ⑥ Collaborators Optional 308 {
PRIMARY
Status- Active
Eligible Employees- 205 | Enrolled Employees- 144
View Details >
}

< BACK

Edit Enrollment for Current Year

Eligible Employees - 205 ⓘ

[Search by plan name]  [Benefit Group: All ▾]  Reset ⟲

( Current | Projected )

| Future Year Plans | Current Year Plans | Benefit Group(s) | Plan Type | Enrollment # | Enrollment % | EE | ES | EC | EF |
|---|---|---|---|---|---|---|---|---|---|
| Blue HDHP 3300 | HDHP 3200 | PRIMARY | Medical/ Rx | 42 | 29.9% | 43 | 0 | 0 | 0 |
| Blue HMO 15 (So CA) | HMO 15 (So CA) | PRIMARY | Medical/ Rx | 12 | 8.3% | 9 | 1 | 1 | 1 |
| Blue HMO 30 (Nor CA) | HMO 15 (Nor CA) | PRIMARY | Medical/ Rx | 36 | 25.0% | 0 | 0 | 0 | 3 |
| Blue PPO 250 90/70 | PPO 150 | PRIMARY | Medical/ Rx | 1 | 0.7% | 1 | 0 | 0 | 0 |
| Blue PPO 500 (OOS O... | CAP 250 | PRIMARY | Medical/ Rx | 1 | 0.7% | 0 | 0 | 0 | 1 |
| Total Medical/ Rx Enrollment | | | | 144 Under -51 ↘ | 100% Under -35% ↘ | 53 | 1 | 1 | 38 |
| Dental Premier PPO | Dental Premier | PRIMARY | Dental | 123 | 77% | 32 | 11 | 17 | 0 |

FIG. 3J

< BACK

Option Overview

[Contribution Model] Comparison

PRIMARY
- Blue HDHP 3300 HSA
- Blue HMO 15 (So CA) HMO
- Blue HMO 30 (Nor CA) HMO
- Blue PPO 250 50/70 PPO
- Blue PPO 500 (OOS Only, Traditional Network) PPO
- Dental Premier PPO PPO
- Dental Standard PPO PPO
- Vision Premier 250

300K

⊙ Option Setup — ⊙ Selected Plans — ③ Contribution Model

Action ˅

| 205 Eligible Employees ⓘ | | $19.56K $7.73K PEPY ⓘ | | $4.78M $855.99K Annual Cost ⓘ | | $4.01M $559.83K Annual ER Cost (Target $5.25M) ⓘ | |

PRIMARY — 205 Eligible Employees — $18.85K PEPY — $1.86K — $4.63M Annual Cost — $700.29K — $3.86M Annual ER Cost — $461.13K

Blue HDHP 3300
Medical/ Rx

| Tiers | Enrollment | Proposed Monthly... | Employee Contribution | Employee Cost Share % | Employee Cost Difference | HSA Funding | Employee $ |
|---|---|---|---|---|---|---|---|
| | | | | | | Flat $ Employee ˅ | |
| Employee | 28 | $944.58 | $0.00 | 0% | -$159.82 | $175.00 | $0.00 |
| Employee + Spo... | 12 | $2,077.96 | $200.00 | 10% | -$135.63 | $300.00 | $200.00 |
| Employee + Chi... | 2 | $1,700.04 | 150 | 0% | -$303.86 | $300.00 | 150 |
| Employee + Fa... | 1 | $2,928.38 | $0.00 | 0% | -$479.46 | $400.00 | $0.00 |
| | 43 | $57,712.22 | $2,400.00 | – | -$7,189.30 | $9,500.00 | $2,400.00 |

< BACK

Option Overview  *

Contribution Model | Comparison

Intern - Full Time
Blue HMO 15 (So CA) HMO
Blue HMO 30 (So CA) HMO

Benefits Eligible
{ Blue HMO 15 (So CA) HMO
  Blue HMO 30 (So CA) HMO
  Dental Plus PPO PPO } — 314

(✓) Option Setup  (✓) Selected Plans  (3) Contribution Model

| | | | | | Action ∨ |
|---|---|---|---|---|---|
| 330 Eligible Employees | $7.50K [$8.26k] PEPY | $2.40K [$7.96k] PEPY | $2.60M [$3.17M] Annual Cost | $2.48M [$2.72M] Annual ER Cost (Target $6.24M) | |
| | | | $99.36K [$328.80k] Annual Cost | $88.40K [$295.62k] Annual ER Cost | |

Intern - Full Time   36 Eligible Employees

[ Flat $ Employee ∨ ]   [⇄]

Blue HMO 30 (So CA)
Medical/ Rx

| Tiers | Enrollment | Proposed Monthly... | Current Monthly Premium | Premium Increase% | Employer Contribution | Employee Cost Share % | Employee $ |
|---|---|---|---|---|---|---|---|
| Employee | 4 | $652.57 | $766.56 | -14% | $517.70 | 86% | $89.87 |
| Employee + Spo... | 1 | $1,435.69 | $1,568.78 | -10% | $1,219.22 | 85% | $216.47 |
| Employee + Chil... | 0 | $1,174.68 | $1,323.98 | -11% | $972.64 | 83% | $202.04 |
| Employee + Fa... | 0 | $2,022.99 | $2,307.61 | -12% | $1,682.80 | 83% | $340.19 |
| | 5 | $4,045.97 | $4,615.02 | — | $3,506.02 | — | $539.95 |

XY, Inc Account

< BACK 90-10
Status: Published

You are logged in as

End Impersonation

Initial Decision | Action ∨

Option Overview

Contribution Model ( Comparison )

Cost Comparison

| Cost Summary |

Plan Comparison

Medical/Rx
Blue HDHP 3300 HSA
Blue HMO 15 (So CA) HMO
Blue HMO 30 (Nor CA) HMO
Blue PPO 250 90/70 PPO
Blue PPO 500 (OOS Only, Traditional Network) PPO

Dental
Dental Premier PPO PPO
Dental Standard PPO PPO

Cost Summary

|  | CURRENT Current Year Benefit Plan | Option 1 90-10 90-10 |  |  |
|---|---|---|---|---|
|  | Total Cost | Option Total Cost | Option $ Change | Option % Change |
| Total Annual Cost | $5.64M | $4.80M | -$836.19K | -15% |
| Employee Cost | $1.07M > | $752.46K | -$317.07K | -30% |
| Employer Cost | $4.57M > | $4.05M | -$519.12K | -11% |
| Medical/Rx | $4.93M > | $4.25M | -$672.81K | -14% |
| Dental | $355.84K | $333.44K | -$22.40K | -6% |
| Vision | $51.64K | $69.36K | $17.72K | 34% |

END-TO-END WORKSPACE ARCHITECTURE TO COLLABORATIVELY MODEL CONFIGURABLE SERVICE OUTCOMES

RELATED APPLICATIONS

This application claims the benefit of Indian Provisional Patent Application No. 202541030050 filed Mar. 28, 2025, the contents of which is incorporated by reference in its entirety herein.

TECHNICAL FIELD

Aspects and embodiments of the disclosure relate to data processing, and more specifically, to an improved workspace architecture to collaboratively model service outcomes.

BACKGROUND

Many organizations can implement data environments to manage and analyze data. The environments can include graphical user interfaces (GUIs) that allow users to interact with structured data models.

BRIEF DESCRIPTION OF THE DRAWINGS

Aspects and embodiments of the present disclosure will be understood more fully from the detailed description given below and from the accompanying drawings of various aspects and embodiments of the disclosure, which, however, should not be taken to limit the disclosure to the specific aspects or embodiments, but are for explanation and understanding only.

DETAILED DESCRIPTION

Figure 1:
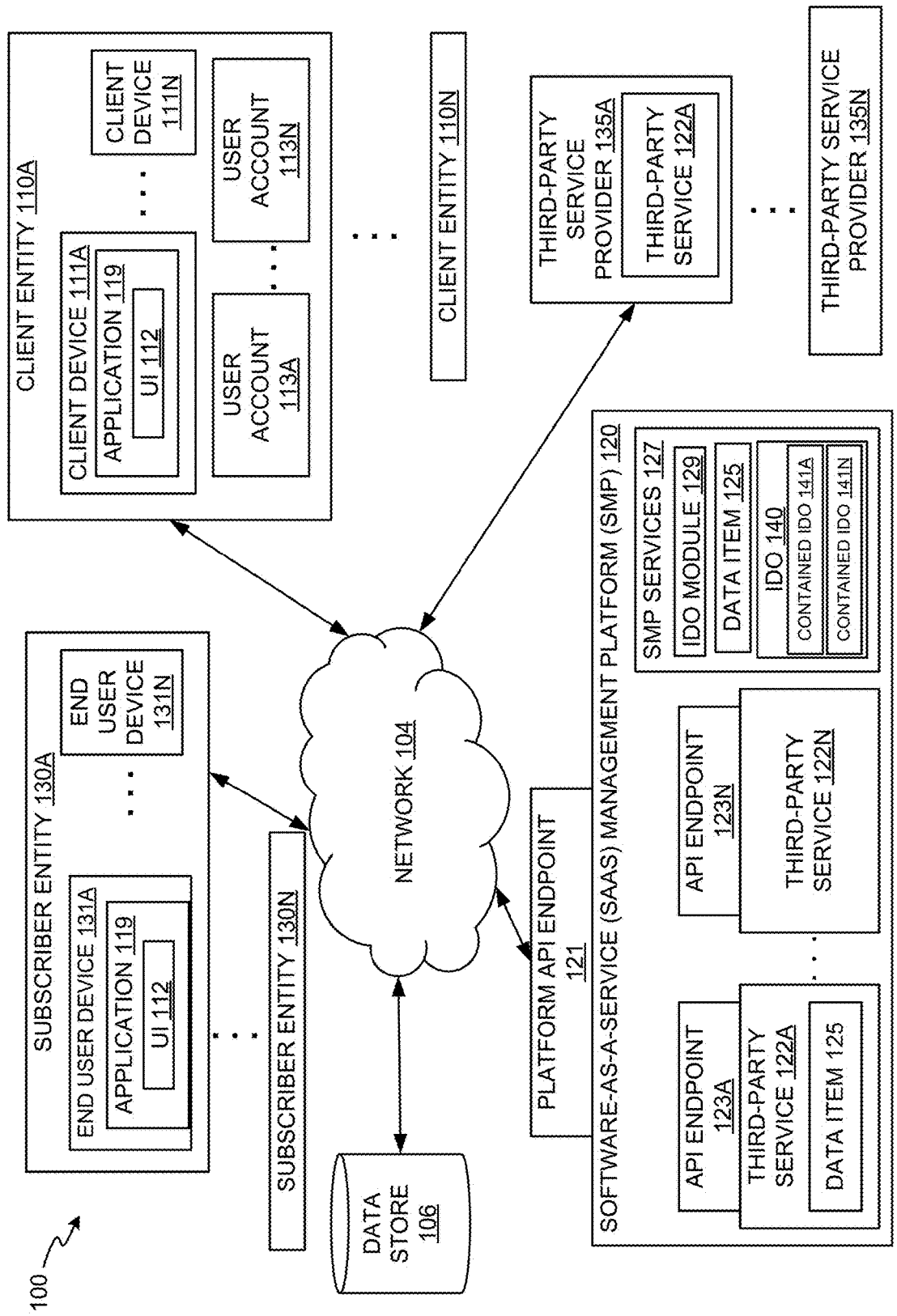
FIG. 1 schematically illustrates an example architecture, in accordance with some embodiments of the disclosure.

Some software systems can implement data environments to manage and analyze data. The environments can include graphical user interfaces (GUIs) that allow users to interact with structured data models. Many of the software systems are challenged in the ability to support dynamic modeling while preserving data integrity, isolated simulations, and/or controlled collaboration among users. Some software systems can permit direct editing of production data, which can create risks of data corruption and/or rely on exported files, which can restrain collaboration and create versioning conflicts. Some software systems may not support the sharing of modeling configurations with downstream users in a manner that allows for secure review, further iterative modeling, and/or approval without disrupting the original data structure.

Moreover, some software systems may lack a unified architecture that can include both front-end interfaces and back-end logic and/or data structures to manage one or more of data state, user permissions, simulations, and computational outcome generation.

Aspects and embodiments of the present disclosure address the above deficiencies, among others, by providing a workspace for users to generate an interactive data object (IDO). The IDO can be configured to contain one or more contained IDOs. In some embodiments, the workspace can provide GUIs to permit users to modify data of the IDO (e.g., user-defined IDO data), while other IDO data may be immutable (e.g., configurations and/or baseline data, and embedded logic). In some embodiments, the workspace can provide GUIs to create one or more contained IDOs that are contained or associated with the IDO (e.g., main IDO) and configured to model outcomes (e.g., contribution model) for new services provided by third-party service providers. Similar to an IDO, the workspace can provide GUIs that permit users to modify data of the contained IDO (e.g., user-defined contained data), while other contained IDO data may be immutable (e.g., configurations and/or baseline data, and embedded logic) and/or based on IDO data in some embodiments. In some embodiments, users can use the GUIs of the workspace to define parameter values for one or more configurable parameters (e.g., user-defined contained data) for each of one or more contained IDOs. In some embodiments, the IDO can serve as a primary persistent data structure, and the contained IDO can be an embedded and independently operable instance associated with the main IDO and that is configured to permit isolated modeling of alternative scenarios. A contained IDO can maintain data and computational independence from the main IDO while using data from the main IDO. Users may use multiple contained IDOs to simulate different variations and outcomes by adjusting and modifying parameter values independently in each of the contained IDOs.

In an illustrative example, a user of a client device corresponding to a client entity can request to create an IDO (e.g., workbook, configuration model, etc.) via a GUI. The GUIs of the workspace can permit the user to select or define one or more benefit groups (e.g., a group of employees that share access to specific benefit offerings under a benefit plan), select one or more available new services (e.g., benefit plans for future years), map current services to new services (e.g., map current benefit plans with new benefit plans that offer similar features), as well as provide additional data. The contained IDO can be used to generate a contribution model for the benefit plans that shows the outcomes (e.g., results, such as employer resource allocation, employee resource allocation, total resource allocation, comparative resource allocation between current and proposed benefit plans, etc.) of different benefit plans using internal model logic, user-defined parameter values and immutable parameters and/or parameter values. Using a contained IDO, the user can select, among the new services of the IDO, a subset of new services to model. The user can also select additional parameter values for configurable parameters as part of the contribution model. For instance, the user can modify employee enrollment to different benefit plans, enrollment in different benefit plans according to benefit group, employee enrollment in different coverage tiers (e.g., a classification that can define persons included under an individual's enrollment in a benefit plan, based on dependent relationships such as self, spouse, children, or family), employee and employer contribution to the benefit plans, among other parameter values. The GUIs can update dynamically using model logic to changes other parameter values affected by the changes to configurable parameters and associated parameter values.

In some embodiments, a notification that indicates that the IDO and/or contained IDOs are ready for review can be sent to an end user device of a subscriber entity. In some embodiments, the client entity that generated the IDO and the subscriber entity are different entities. The end user device using GUIs of workspace can review information of the IDO and contained IDO.

Aspects and embodiments of the present disclosure also address the above deficiencies, among others, by providing an end-to-end workspace architecture to collaboratively model configurable service outcomes. In some embodiments, a client entity can upload information for one or more new services provided by third-party service providers to the SaaS management platform. The uploaded information can be used at least in part as IDO information for an IDO. The client device can select, among multiple subscriber entity accounts, a subscriber entity for which an IDO is created and modified. The IDO can include IDO data that pertains to the selected subscriber entity. The user of client device can modify some parameter values for configurable IDO parameters to generated user-defined IDO data for the IDO. In some embodiments, one or more contained IDOs can be automatically generated based on assumptions corresponding to previous and current services. In some embodiments, the user of the client device can create a contained IDO to model outcomes of one or more new services, and modify some parameter values of configurable parameters. The IDO can be saved and published by the client entity, and a notification can be sent to the client entity indicating the IDO and contained IDO(s) are ready for review.

In some embodiments, the subscriber entity can review the IDO and contained IDO. The subscriber entity can approve the contained IDO, which can approve the new services corresponding to the contained IDO. The approval can be sent, via the SaaS management platform, to the client entity. Responsive to the approval, the client entity can cause an initiation of the new services and the new services can be facilitated via the SaaS management platform.

In some embodiments, the subscriber entity can perform additional modeling of outcomes by duplicating the contained IDO. The initial duplicate contained IDO can keep the contained IDO data of the contained IDO and permit the subscriber entity to modify configurable parameters to model different scenarios. In some embodiments, the end user device can request the SaaS management platform to duplicate the contained IDO and store the duplicate contained IDO at the IDO. The configurable parameters of the duplicate contained IDO can be modified with parameter values selected by the end user, and the end user can model alternative outcomes of new services using parameter values selected by the end user. The duplicate contained IDO can be saved and sent for review by the client entity via the SaaS management platform.

For example, the end user device can receive the IDO and view a summary of information of both the IDO and contained IDO using GUIs of the workspace. The GUIs can use one or more visual GUI elements to visually display the summary information. The end user can decide to simulate slightly different parameter values for the contained IDO and duplicate the contained IDO to maintain data integrity of the contained IDO and generate an isolated modeling environment. The end user can modify configurable parameters of the duplicate contained IDO, such as employer and employee contribution to benefit plans, and the duplicate contained IDO can model alternative outcomes for the one or more new benefit plans using the new employer and employee contribution data.

In some embodiments, the third-party service provider(s) providing the services can be a different entity from both the client entity and subscriber entity. In some embodiments, the SaaS management platform can be a different entity from the client entity, subscriber entity and third-party service provider(s). In some embodiments, the SaaS management platform can be the same entity as the client entity.

The workspace architecture and corresponding operations described herein improve the functioning of the computer system by enabling users to model configurable service outcomes in isolated, version-controlled data structures without modifying underlying production data. This enhances system integrity, reduces processing overhead, and provides a more efficient, responsive workspace for scenario modeling in environments, such as multi-tenant environments.

The disclosed systems and methods also provides a technical improvement by implementing an end-to-end computer-implemented workspace architecture that enables client entities to model configurable service outcomes for different subscriber entities using isolated interactive data objects (IDOs and contained IDOs), share results with subscriber entities through a secure access-controlled interfaces that permit subscriber entities to approve the proposed services and/or generate new contained IDOs to model alternative scenarios. This improves the functionality of the computer system by facilitating modular, state-preserving simulations, reducing data redundancy, enabling dynamic user input across distinct roles, and maintaining the integrity and auditability of service configuration workflows and data in a computer environment, such as a multi-tenant environment.

The disclosed workspace architecture provides a technical improvement in the way a computer system creates, stores and/or manipulates data models. For example, an IDO framework introduces an organized and layered data structure in which a persistent main IDO (e.g., parent) can securely house one or more independently operable contained IDOs. This hierarchical construct together with embedded model logic can permit isolated, version-controlled simulations while maintaining referential links to source data (e.g., data of the main IDO) without copying or overwriting the production data (e.g., data of a contained IDO). Such architecture reduces memory consumption, can reduce race conditions and data corruptions that conventionally occur when multiple users edit a single data object.

The disclosed GUIs are specifically configured to use the underlying IDO and contained IDO data framework. The GUIs can dynamically surface parameters that are mutable for a given user role, enforce immutability of baseline parameters and values, and provide real-time recalculation of dependent values responsive to modification of configurable parameters. The coupling between the IDO framework and the GUIs can improve the human-machine interface to streamline complex "what-if" modeling, reduces the number of screens and user selections (e.g., clicks) to perform multi-scenario simulations and prevents erroneous data entry. The GUIs enhance computer interaction efficiency and usability.

One or more of the self-contained data structures, the enforced isolation of simulations, role aware GUIs, and synergy between the aforementioned yield technical benefits unattainable by conventional systems, such as spreadsheets or file-based approaches. Among other advantages, the architecture can (i) enforce reliable transaction processing in databases to ensure data integrity and consistency (ii) enable cloning of complex scenario trees without duplicating underlying data, and (iii) record an audit trail of parameter changes.

As used herein, an "entity" (also referred to as "organization" herein) can refer to an entity or organization, such as a legal entity that includes multiple people (e.g., organization personnel) that has a particular purpose. Examples of entities can include government agencies, non-profits, corporations (e.g., authorized by law to act as a single entity or legal entity) and partnerships. An entity can include a logically distinct entity that governs or controls the particular entity's data, user access and/or system configurations. Different entities can describe one or more entities that are independent or distinct from the other entities (e.g., do not govern or control another entity's data, user access or system configurations). Different entities can be independent from another entity whereby at least the entities are different legal entities or the different entities are controlled by different organizations, for example For example, a first entity can be corporation A and a second entity can be corporation B. Corporation A can be considered an independent legal entity from corporation B. Each of corporation A and corporation B make independent decisions, have a different hierarchical structure, and use different job titles. A department (or sub-department) can refer to a group within an entity that contributes to an entity's mission or goals. In some embodiments, departments of an entity can be based on the function the department serves within the entity. For example, departments of an entity can include research and development (R&D), Marketing, Legal, Human Resources, Accounting, among other. Each of the various departments can include one or more individuals that perform the function of the respective department.

FIG. 1 schematically illustrates an example architecture 100, in accordance with some embodiments of the disclosure. The architecture 100 (also referred to as "system 100" herein) includes a software-as-a-service (SaaS) management platform 120 (also referred to herein as "SaaS management platform 120"), a server 130, a data store 106, and one or more client entities 110A-N (generally referred to as "client entity(s) 110" herein) connected to network 104. Client entity 110 can also be referred to as "client organization" herein. In some embodiments, architecture 100 can include one or more third-party service providers 135A-135N (generally referred to as "third-party service provider(s) 135" herein). In some embodiments, architecture 100 can also include subscriber entities 130A-130N (generally referred to as "subscriber entity(s) 130" herein). Subscriber entity 130 is also referred to as "subscriber organization" herein.

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing information. Data store 106 can be hosted by one or more storage devices, such as main memory, magnetic or optical storage-based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by SaaS management platform 120, or one or more different machines coupled to the server hosting the SaaS management platform 120 via the network 104. In some embodiments, data store 106 can be capable of storing one or more data items 125, as well as data structures to tag, organize, and index the data items 125. A data item 125 can include various types of data including structured data, unstructured data, or types of digital files, including text data, audio data, image data, video data, multimedia, interactive media, data objects, and/or any suitable type of digital resource, among other types of data. An example of a data item 125 can include a file, database record, programming code, or document, among others.

A client entity (e.g., a client entity 110) can refer to an organization or entity that uses the services provided by the SaaS management platform 120. The client entities 110A-N can each include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. In some embodiments, a client entity 110 can include client devices 111A-N (generally referred to as "client device(s) 110"), which may also be referred to as "user devices." Client devices 111 may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 111 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client entity 110 is a different entity than the entity implementing the SaaS management platform 120. In some embodiments, the client entity 110 is a client (e.g., customer) of SaaS management platform 120. In some embodiments, client entity 110 is the same entity as the entity implementing the SaaS management platform 120.

In some embodiments, SaaS management platform 120 can provide one or more organizational accounts (not shown) that are assigned to a particular organization, such as a client entity 110A. For example, corporation A can be assigned organizational account A. In some embodiments, SaaS management platform 120 can provide an organizational account with one or more user accounts. For example, organizational account A can be a root account and user accounts 113A-113N can be under the root account in a hierarchical structure. In some embodiments, a client entity 110 (or SaaS management platform 120) can assign user accounts 113A-N to respective users within the organization. User accounts 113A-N (also generally referred to herein as "user account 113") (also referred to a "client account" herein) can be used to access SaaS management platform 120 via client devices 111A-N. A "user" can be an individual of the organization associated with a respective user account 113. In some embodiments, aspects of the disclosure encompass a "user" being an entity controlled by a group of organization personnel and/or an automated source. For example, a group of organization personnel federated as one or more departments in an organization can be considered a "user." Each user account 113 can be assigned authorization credentials to access the SaaS management platform 120 (e.g., a username and password) and further use authentication credentials (e.g., an access token, etc.) to access specific services provided thereby. In some embodiments, user accounts 113A-N can include enhanced privileges (e.g., administrator accounts, information technology (IT) specialist accounts, etc.).

The SaaS management platform 120 can be a platform that can provide services to one or more client entities 110A-N. The SaaS management platform 120 can be accessible, at least in part, by one or more user accounts 113A-N provided or assigned to client entity 110 by SaaS management platform 120. As described above, a user account 113 can access the SaaS management platform 120 by providing authentication credentials via an application on a client device 111 of the client entity 110. The SaaS management platform 120 can provide one or more services to a client device 111 associated with the user accounts 113 that has provided proper authentication credentials.

In some embodiments, the client entity 110 is a tenant of a multitenant system hosted by SaaS management platform 120. In some embodiments, SaaS management platform 120 can include a multitenant system. Multitenancy can refer to a mode of operation of software applications where multiple independent instances of one or multiple applications operate in a shared computer environment. In some embodiments, the instances (tenants, such a client entities) can be logically isolated, but physically integrated. The degree of logical isolation can be complete, but the degree of physical integration can vary. The tenants (application instances) can be representations of organizations that obtain access to the multitenant system. The tenants may also be multiple applications competing for shared underlying resources. Multiple organizations can access the resources of SaaS management platform 120 without any indication that the resources are shared between the multiple organizations. The data of each of the organizations can be logically isolated from one another such that each organization has access to their own data but not the data of other organizations in the multitenant system. In some embodiments, SaaS management platform 120 can include a single tenant system.

A subscriber entity (e.g., a subscriber entity 130) can refer to an organization or entity that is a customer (e.g., end user) of client entity 110. In some embodiments, each of the subscriber entities 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. In some embodiments, subscriber entity 130 is a different entity than client entity 110 and/or the entity implementing SaaS management platform 120. In some embodiments, the subscriber entities 130A-N can each include one or more computing devices such as personal computers (PCs), laptops, mobile phones, smart phones, tablet computers, netbook computers, network-connected televisions, etc. In some embodiments, a subscriber entity 130 can include end user devices 131A-131N (generally referred to as "end user device(s) 131" herein). End user devices 131 can be similar to client devices 111 and the description of client devices can equally apply to end user devices 131, unless otherwise described.

In some embodiments, subscriber entity 130 subscribes to and uses services, such as third-party services 122, facilitated by the SaaS management platform 120. In some embodiments, the client entity 110A can provide scenario modeling to subscriber entities 130 using modeling and evaluation services of SaaS management platform 120. In some embodiments, the subscriber entity 130 can consume the modeling and evaluation services and subscribe to the third-party services 122. In some embodiments and as noted above, the client entity 110 can be a tenant of a multitenant system of the SaaS management platform 120. In some embodiments, the one or more subscriber entities 130 can be entities within the client entity's tenancy. In some embodiments, a new tenancy is created for a subscriber entity 130. For example, the client entity 110 can provision a separate tenancy for the subscriber entity 130.

In some embodiments, third-party service providers 135A-135N (generally referred to as "third-party service provider(s) 135" herein) can provide third-party services 122A (-122N, not shown) via the SaaS management platform 120. In some embodiments, the third-party services can be first-party services provided by SaaS management platform 120. In some embodiments, the SaaS management platform 120 can include one or more third-party services 122A-N (generally referred to as "third-party service(s) 122" herein). In some embodiments, the SaaS management platform 120 can facilitate one more third-party services. In some embodiments, the SaaS management platform 120 can include one or more first-party services, illustratively shown as SaaS management platform services 127. When a client device 111 associated with a user account 113 accesses the SaaS management platform 120, the SaaS management platform 120 can provide the client device 111 with access to one or more services (e.g., one or more third-party services 122A-N) based on the particular service authorization associated with the user account. One or more data item(s) 125 can be accessed via the authorized services. In some embodiments, the client device 111 can access the data item 125 using one or more of the SaaS management platform services 127. In some embodiments, the client device 111 can access the data item 125 using one or more third-party services 122. The client device 111 receives a data item 125 from the SaaS management platform 120 in response to a request for the data item. In some embodiments, the SaaS management platform 120 can function as a "black box" with respect to the client device 111. That is, regardless of the original source of the data item 125 (e.g., whether from the SaaS management platform service 127, or from one or more third-party services 122A-N) the client device 111 can receive the data item 125 as if the data item 125 originated from the SaaS management platform 120. For example, the SaaS management platform 120 can include a third-party service 122 that digital resource management services to a client entity 110, or the functionality to deploy services of the third-party service 122 such as software applications to a client entity 110 for an on-demand service. In another example, the SaaS management platform can include a third-party service 122 that can deliver and/or license software applications on a subscription basis while the third-party service 122 hosts, at least in part, the software application. In some embodiments, the licensed software applications can, at least in part, be hosted on the infrastructure, such as the cloud computing resources of the third-party service 122. Examples of software applications provided to the SaaS management platform by one or more third-party services 122 can include a database management SaaS service, a software suite SaaS service, a human resources SaaS service, etc.

A third-party can refer to an entity, such as an entity or organization (e.g., third-party service provider) that is distinct and/or external from a first-party entity, such as the SaaS management platform 120. In some embodiments, the third-party service(s) can be offered to the client entity 110A in a manner that is opaque to the users of a client entity 110A, such that access to any SaaS services (first-party or third-party) appears to the users as an access of the SaaS management platform 120.

In the illustrated example, a client device 111 can access the SaaS management platform 120 through network 104 using one or more API calls via platform API endpoint 121. In some embodiments, SaaS management platform 120 can include multiple platform API endpoints 121 that can expose services, functionality, or services of the SaaS management platform 120 to one or more client devices 111A-N of a client entity 110 and/or one or more end user devices 131A-N of subscriber entity 130. In some embodiments, a platform API endpoint 121 can be one end of a communication channel, where the other end can be another system, such as a client device 111 associated with a user account 113 of a client entity 110. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP or HTTPS methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or data items 125 provided by the SaaS management platform 120. The platform API can be used in programmatically obtaining one or more data items 125 associated with a request for services and/or data items 125. In some embodiments, the platform API is implemented in connection with a multitenant communication service wherein different accounts (e.g., authenticated entities such as user accounts 113A-N) can submit independent requests. These requests made using API calls via Platform API endpoint 121 can be managed with consideration of other requests made within a user account 113 and/or across multiple user accounts (e.g., user accounts 113A-N) on the SaaS management platform 120.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the SaaS management platform 120 can expose through the API, a set of API resources which when addressed can be used for requesting different actions, inspecting state or data, and/or otherwise interacting with the SaaS management platform 120. In some embodiments, a REST API and/or another type of API can work according to an application layer request and response model. An application layer request and response model can use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the SaaS management platform 120 can observe the principles of a RESTful design or the protocol of the type of API. RESTful is understood in this document to describe a Representational State Transfer architecture. The RESTful HTTP requests can be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the platform API endpoint 121 can include an access request instruction module (e.g., access request module) that can be called within an application, script, or other computer instruction execution. For example, a computing platform can support the execution of a set of program instructions where at least one instruction within a script or other application logic is used in specifying an access request and communicating that request. In some embodiments, the platform API endpoint 121 can include a console, administrator interface, or other suitable type of user interface. Such a user-facing interface can be a graphical user interface (GUI). Such a user interface can additionally work in connection with a programmatic interface.

In some embodiments, the platform API request (e.g., API call to platform API endpoint 121) can include a data object characterizing the properties of one or more services and/or data items 125 to be accessed. In some embodiments, the platform API request can be associated with other API requests (e.g., API calls to API endpoints 123A-N) that are programmatically initiated by SaaS management platform 120 (e.g., via SaaS management platform services 127). In some embodiments, the platform API request can be initiated from another (e.g., previous) access request. In some embodiments, service API requests to API endpoints 123A-N can be programmatically initiated from platform API requests to platform API endpoint 121. For example, the SaaS management platform 120 can receive a platform API request for a data item 125 that is provided by or hosted on a third-party service 122. The SaaS management platform services 127 can programmatically initiate a service API request to the API endpoint 123A-N of the respective one or more third-party services 122A-N corresponding to the requested data item 125. In some embodiments, the SaaS management platform 120 can offer third-party services (and first-party services) by making only platform API requests (received through platform API endpoint 121) available to end users (e.g., users of user accounts 113A-N).

In the illustrated example, a client device 111 associated with a user account 113 can send a platform API request to the SaaS management platform 120 for a data item 125 through platform API endpoint 121. The platform API request can be processed by the SaaS management platform 120 at platform API endpoint 121. Based on the contents or nature of the request, the SaaS management platform 120 can determine the source of the data item 125 that has been requested by the client device (e.g., by using SaaS management platform service 127). If the data item 125 is available from the SaaS management platform service 127 then the SaaS management platform 120 can provide the data item 125 to the client device 111 without making a third-party API call to an API endpoint 123A-123N. If the data item 125 is available from a third-party service 122, the SaaS management platform 120 can generate and send a service API request to the respective third-party service 122A-N through the corresponding API endpoint 123A-N. Responsive to receiving the data item 125 from the third-party service 122 (in response to the generated service API request), the SaaS management platform services 127 can provide the data item 125 to the client device 111. In some embodiments, an API request (e.g., platform API call) sent by the client device 111 does not identify a service API call to a third-party service 122 or corresponding API endpoints 123A-N. In other embodiments, an API request sent by client device 11 does identify a service API call to a third-party service 122. For example, the client device can directly access a third-party service 122 using service API calls provided by the third-party service.

In some embodiments, a client device and/or end user device, such as client device 111A and end user device 131A respectively, can implement or include one or more applications, such as application 119 (also referred to as "client application" herein) executed at client device 111A. In some embodiments, application 119 can be used to communicate (e.g., send and receive information) with SaaS management platform 120. In some embodiments, application 119 can implement user interfaces (e.g., GUIs), such as user interface 112 that may be webpages rendered by a web browser and displayed on the client device 111A in a web browser window. In another embodiment, the user interfaces 112 of application 119 may be included in a stand-alone application downloaded to the client device 111A and natively running on the client device 111A (also referred to as a "native application" or "native client application" herein). In some embodiments, client devices 111 and/or end user devices 131, under direction of the SaaS management platform 120 when connected, can present (e.g., display) a UI 112 to a user of a respective client device 111 or end user device 131 through application 119. The client devices 111 and/or end user device 131 may also collect input from users through input features.

In some embodiments, a UI 112 may include various visual elements (e.g., UI elements) and regions, and can be a mechanism by which the user engages with the SaaS management platform 120, and the system 100 at large. In some embodiments, the UI 112 of a client device 111 can include multiple visual elements and regions that enable presentation of information, for decision-making, content delivery, etc. at a client device 111. In some embodiments, a visual element can represent data textually and/or graphically and allow users to explore and or modify parameters and/or parameter values. In some embodiments, the visual element(s) can present outcomes (e.g., results) in real time responsive to modification of parameter values.

In some embodiments, the UI 112 and/or client device 111 can include input features to intake information from a client device 111. In one or more examples, a user of client device 111 can provide input data (e.g., a user query, control commands, etc.) into an input feature of the UI 112 or client device 111, for transmission to the SaaS management platform 120, and the system 100 at large. Input features of UI 112 and/or client device 111 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 111 can use to input textual data (e.g., a user query).

The application 119 via client device 111 can then transmit that textual data to SaaS management platform 120, and the system 100 at large, for further processing. In other examples, input features can include a selection list, in which a user of client device 111 can input selection data e.g., by selecting, or clicking. The application 119 via client device 111 can then transmit that selection data to SaaS management platform 120, and the system 100 at large, for further processing.

In some embodiments, SaaS management platform services 127 can also include an interactive data object (IDO) module 129 that can implement features as described herein. IDO module 129 may include hardware and/or software configured to assist rendering a workspace via a GUI and/or organize, manage and facilitate IDOs, such as IDO 140 and contained IDOs 141A-141N. In some embodiments, client devices 111 and/or end user devices 131 can include IDO module 129 to implement features as described herein. For example, IDO module 129 may be implemented with application 119 in some embodiments.

A workspace can refer to an environment or architecture of SaaS management platform 120 that organizes and manages IDOs, contained IDOs and related configurations. A workspace can include an interface, such as a GUI that allows users to interact with data, modify parameters and/or parameter values, visualize data, and/or approve data. The workspace can provide the environment that manages workflows. In some embodiments, the workspace can include a front-end interface (e.g., GUIs) and/or back-end components that enable users to create, manage, and interact with structured data such as IDO 140 and/or contained IDO 141.

An interactive data object (IDO) 140 can refer to a structured, persistent, and/or configurable data object that can store, process and/or interact with one or more of user-defined inputs, system logic (e.g., model logic), other IDO data and/or visual data components. In some embodiments, the IDO can support user interaction, parameters adjustment, and logic (e.g., model logic) to simulate outcomes in a digital workspace. In some embodiments, an IDO 140 can model relationships between data, such as parameter values for configurable parameters to generate the outcomes (e.g., results). For example, an IDO 140 can capture benefit information, cost structures and benefit plan details. The IDO 140 can permit users to modify parameters and/or parameters values and analyze outputs via a GUI. The IDO 140 can also support visualization components such as dashboards, graphs, and tables that reflect the data of the IDO 140. In some embodiments, the IDO 140 can apply internal logic (non-user defined model logic) to generate calculated outputs, such as outcomes. In some embodiments, the data in an IDO 140 can be isolated from data from another IDO. In an illustrative example, an IDO 140 can include a workbook or configuration object, such as a collaborative workbook.

In some embodiments, an IDO 140 can include IDO data. In some embodiments, the IDO data can include user-defined IDO data (e.g., mutable data) and non-user defined IDO data (e.g., immutable data). In some embodiments, the IDO 140 can include or be associated with model logic. Model logic can include one or more computational rules, formulas, and/or data relationships implemented in an IDO 140 and/or contained IDO 141. In some embodiments, model logic can enable summarization of IDO data (and/or contained data), visualization of data, and/or generation of outcomes based on configurable parameters.

A contained IDO, such as contained IDOs 141A-141N (generally referred to as "contained IDO(s) 141" herein) can be an IDO that is contained in the main IDO 140. A contained IDO can refer to an embedded and independently operable instance of an IDO that is associated with a main IDO (e.g., IDO 140) that can enable data isolation. In some embodiments, the contained IDO 141 can enable isolation of modeling alternative configurations without altering the data or state of the IDO 140. The contained IDO can exist within IDO 140 but can function independently. In some embodiments, the contained IDO 141 is configured to derive data using at least in part data from the IDO 140 and store the derived data without altering the data of the IDO 140. In some embodiments, the contained IDO 141 can permit users to model different configurations (e.g., different parameter variables) and can generate outcomes based on the different configurations. In some embodiments, one or more contained IDOs can be contained in IDO 140. The contained IDOs function independently and do not alter the data of IDO 140 or other contained IDOs.

In some embodiments, the contained IDO 141 can exist within the context of the main IDO but maintain its own inputs, parameter values and/or computational outcomes. The IDO 140 can manage IDO data (e.g., primary data) while each contained IDO 141 can represent a sandbox simulation of outcomes. In some embodiments, modifications made within a contained IDO do not propagate back to the main IDO unless explicitly approved or integrated. In some embodiments, the IDO 140 can serve as the source of truth and primary configuration object, and may store persistent data (e.g., IDO data). The contained IDOs 140 can be designed for "what-if" modeling, user-specific configurations, and/or interactive proposals based at least on that IDO data of IDO 140.

For example, an IDO 140 can include a workbook or configuration object that stores employer data, employee data, and historical benefit plan data, and available new benefit plans for the next year. The contained IDO 141 can include a worksheet or variation instance that models a specific scenario within the workbook (e.g., scenario where the benefit contribution between employer and employee is 80 percent to 20 percent respectively) that does not affect the data of IDO 140. The contained IDO 141 can use data from the IDO 140 to calculate outcomes based on changes to the contained data of the contained IDO 141. The changes can be based on user input that adjusts parameters and/or parameter values. The changes can be made and/or stored without changing the data of the main IDO 140.

In some embodiments, a contained IDO 141 can include contained data (also referred to as "contained IDO data" herein). In some embodiments, the contained data can include user-defined contained data (e.g., mutable data) and non-user defined contained data (e.g., immutable data). In some embodiments, the contained IDO 141 can include or be associated with model logic.

In some embodiments, SaaS management platform 120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items 125 of the SaaS management platform 120 (e.g., through SaaS management platform services 127 and/or one or more third-party services 122) or that can be used to provide a user with a dashboard GUI. The SaaS management platform 120 can also include a website (e.g., a webpage) or application back-end software that can be used to provide user with access to the SaaS management platform 120.

It should be noted that in some other embodiments, one or more of the functions of SaaS management platform 120 can be provided by a greater number of machines. In addition, the functionality attributed to a particular component of the SaaS management platform 120 can be performed by different or multiple components operating together. As described above, the SaaS management platform 120 can also be accessed as a service provided to other systems or devices through various embodiments of platform API endpoints, and thus is not limited to use in websites. Although embodiments of the disclosure are discussed in terms of SaaS management platforms, embodiments can also be generally applied to any type of platform or service.

In situations in which the systems discussed here collect personal information about users, or can make use of personal information, the users can be provided with an opportunity to control whether or how the SaaS management platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the SaaS management platform 120.

Figure 2A:
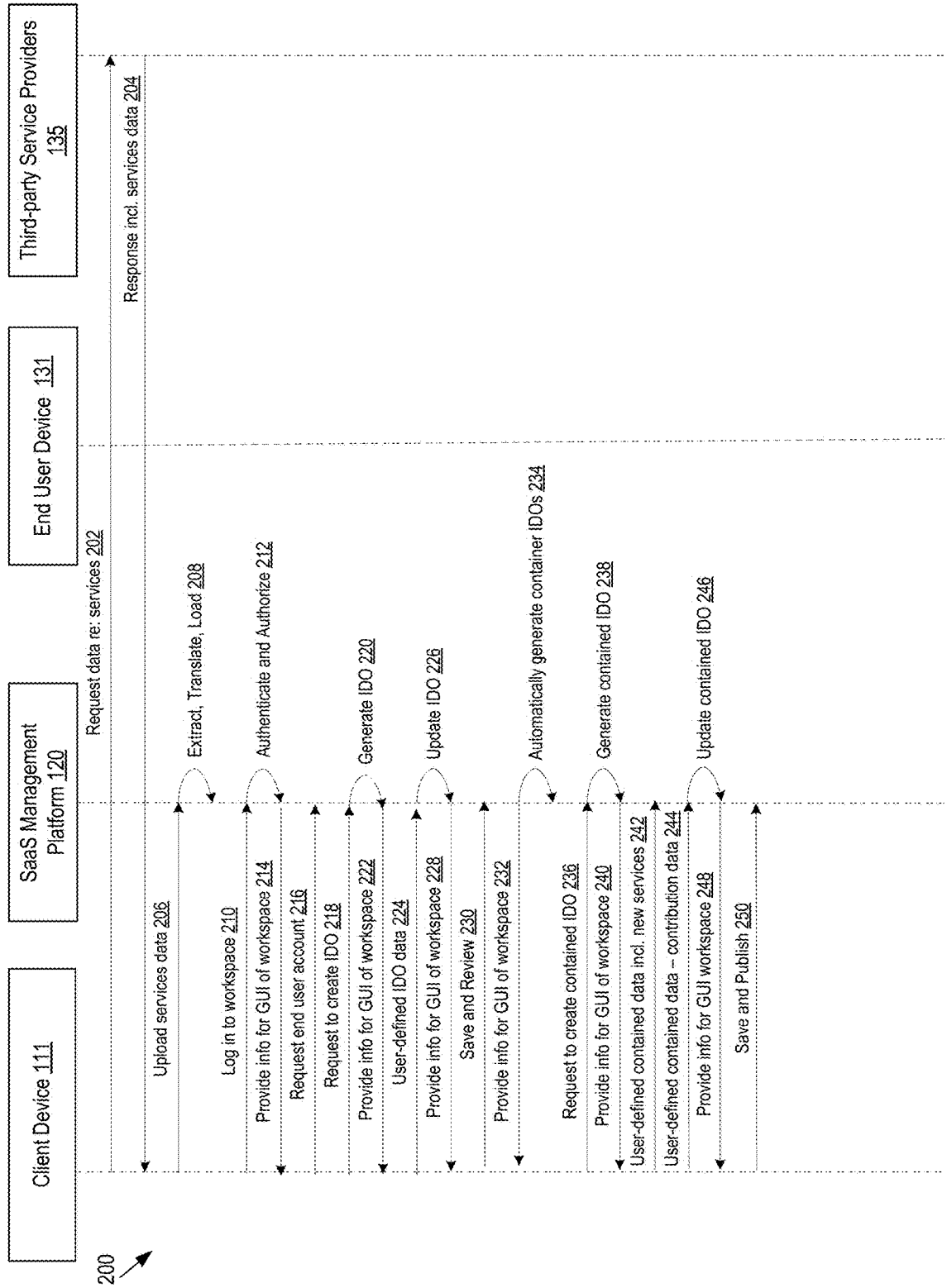
FIG. 2A-2B illustrate a sequence diagram showing an end-to-end workflow for modeling services, in accordance with some embodiments of the disclosure.
Figure 2B:
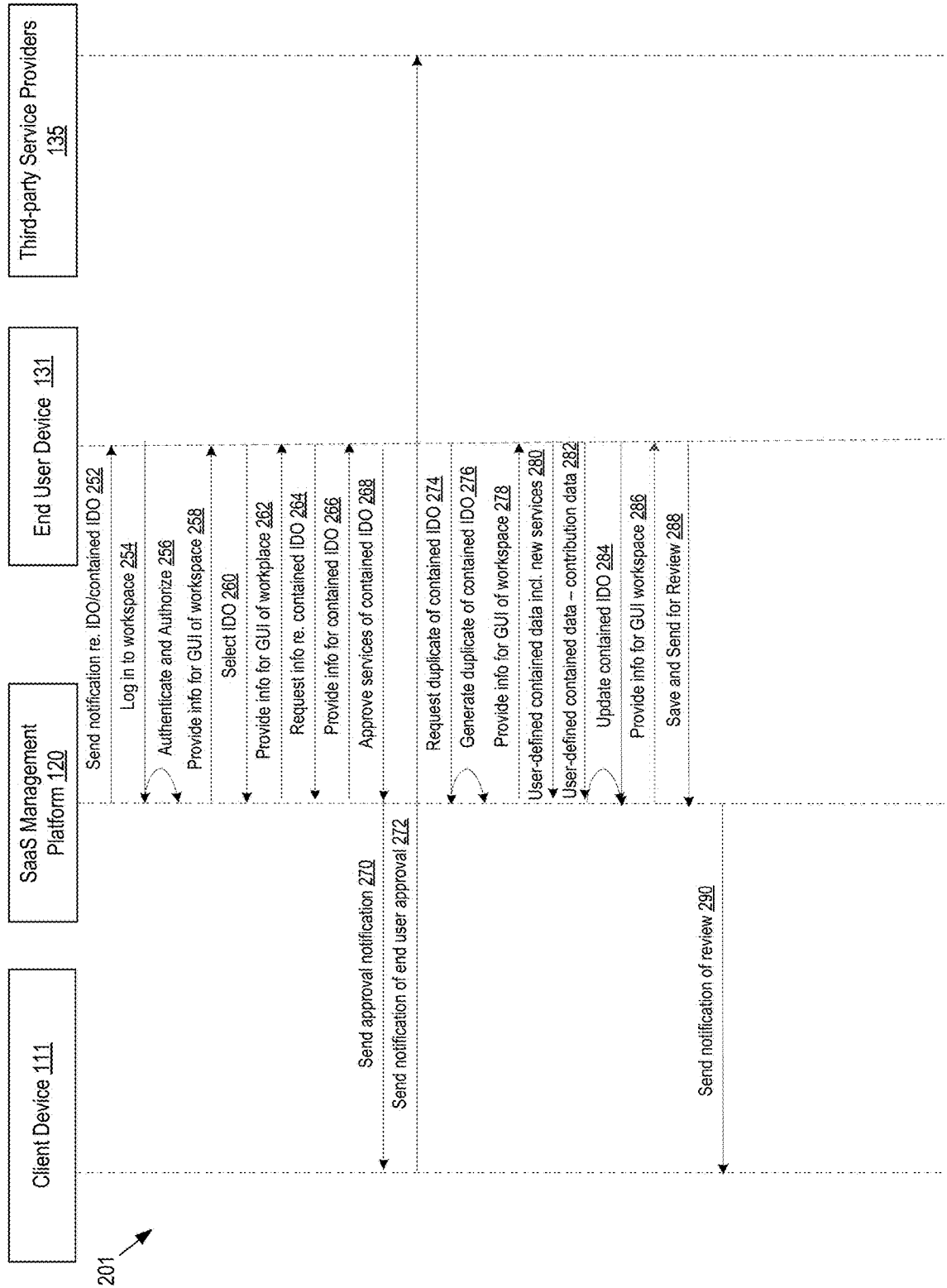

Elements of FIG. 1 are used with respect to FIG. 2A-2B to help describe features of diagram 200 and diagram 201. The operations described with respect to FIG. 2A-2B are shown to be performed serially for the sake of illustration, rather than limitation. Although shown in a particular sequence or order the order of the operations can be modified, unless otherwise specified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

FIG. 2A-2B illustrate a sequence diagram of showing an end-to-end workflow for the modeling of services, in accordance with some embodiments of the disclosure.

Diagrams 200 and 201 illustrate SaaS management platform 120, client device 111 of client entity 110, end user device 131 of subscriber entity 130, and third-party service providers 135. In some embodiments, third-party service providers 135 represent one or more third-party service providers. In some embodiments, one or more of SaaS management platform 120, client device 111 of client entity 110, end user device 131 of subscriber entity 130, and third-party service providers 135 can implement the operations depicted in diagrams 200 and 201. In some embodiments, one or more of client device 111, SaaS management platform 120 and/or end user device 131 can implement IDO module 129 to execute the operations described with respect to FIG. 2A-2B. It can be appreciated that any of the communications between SaaS management platform 120 and any of client device 111, end user device 131 and third-party service providers 135 can be performed using API calls, unless otherwise advised.

In an illustrative example, subscriber entity 130 can desire to renew services, such as benefit plans. A benefit plan can refer to a service provided by, for example a third-party provider 135 that provides employees with protections covering one or more of medical expenses, dental expenses, vision expenses, disability support, such as long term disability (LTD) insurance, short term disability (STD) insurance, and life insurance. A benefit plan can outline coverage details, contribution structures, eligibility criteria, and available benefits. In some embodiments, the benefits can be administered and/or managed via the SaaS management platform 120. Each year a subscriber entity 130 may renew their benefit plan with the same and or different third-party service providers 135. In some embodiments, the client entity 110, on behalf of the subscriber entity 130, can request information on benefit plans as part of a benefits renewal process. The request can specify information, such as number of employees and coverage requirements requested by the subscriber entity 130. The response can include benefits information such as the details and contents of the benefit or coverage options, coverage tiers, plan variants, and/or coverage costs. In some embodiments, the subscriber entity 130 can use client entity 110 to assist and manage the process of benefits renewal. In some embodiments, the client entity 110 can use SaaS management platform 120 to manage the workflow of benefits renewal, as illustrated in the operations of diagrams 200 and 201.

At operation 202, client device 111 can send a request for data on one or more services provided by one or more third-party service providers 135. In some embodiments, a request can be made on behalf of a subscriber entity 130. In some embodiments, the request is specific to the particular subscriber entity 130. For instance, the request can be made with specific data pertaining to the subscriber entity 130. In some embodiments, the client device 111 can make the request through the SaaS management platform 120 and the SaaS management platform 120 can send a request (modified or unmodified) to the one or more third-party service providers 135.

At operation 204, the one or more third-party service providers 135 provide client device 111 with the services data. In some embodiments, the SaaS management platform 120 receives the services data and sends the services data (modified or unmodified) to client device 111.

In an illustrative example and as noted above, the services data can include benefits data directed to a renewal of benefit plans for the subscriber entity 130.

At operation 206, client device 111 sends SaaS management platform 120 the services data. In some embodiments and as noted above, the services data is received from the one or more third-party service providers 135.

At operation 208, SaaS management platform 120 can perform one or more of extracting, transforming and loading the services data. The services data is gathered from one or more sources (e.g., extract), the extracted services data is cleaned, formatted, and transformed into a standardized structure (e.g., filtering, aggregating, joining datasets) (e.g., transformed), and the processed services data can be loaded into a target system (e.g., SaaS management platform 120 or data store 106) to perform data analysis.

At operation 210, client device 111 logs in to the workspace of the SaaS management platform 120. In some embodiments, client device 111 can use one or more credentials associated with a user account to log in to SaaS management platform 120, and in particular the workspace of SaaS management platform 120.

At operation 212, SaaS management platform 120 can authenticate the user associated with the user account and perform an authorization operation to determine whether the user account is authorized to access the workspace.

At operation 214, if the user and user account are both authenticated and authorized, SaaS management platform 120 can send information to client device 111 to render the GUI of workspace at client device 111.

Figure 3A:
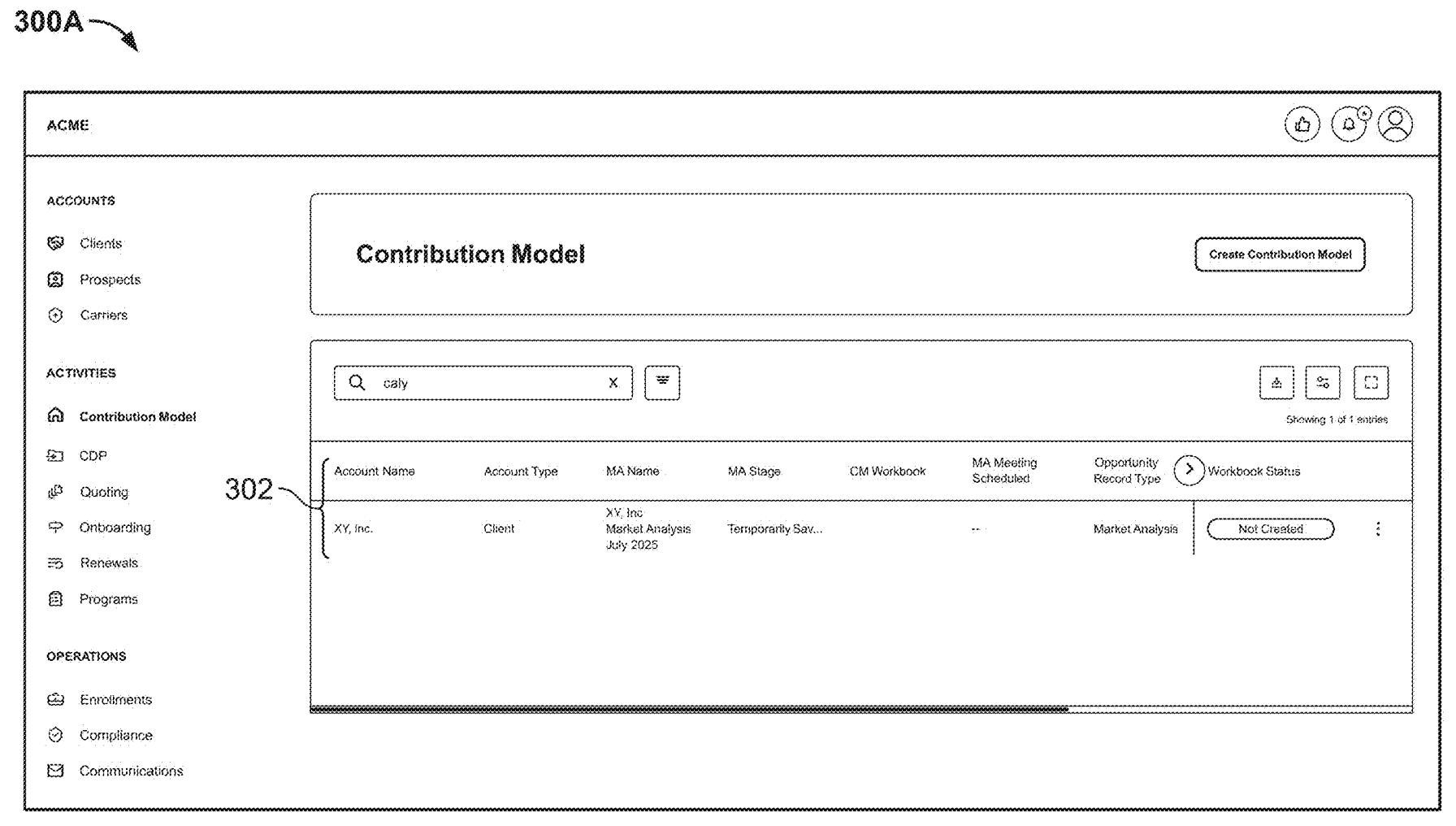

At operation 216, the workspace provides options to select from one or more end user accounts associated with different subscriber entities 130, as illustrated in GUI 300A of FIG. 3A. For example, the different subscriber entities 130 can be customers of client entity 110.

At operation 218, the workspace provides an option to create an IDO 140 for the particular end user account selected at operation 216. For example, a GUI of the workspace can permit client device 111 to create a workbook or configuration object on behalf of the subscriber entity 130.

At operation 220, SaaS management platform 120 can generate an IDO 140. The IDO 140 can include services data or data derived from services data. For example, the IDO data can include data pertaining to one or more previous services (e.g., current services). For instance, the IDO data can include information pertaining to benefit plans in which the subscriber entity is currently enrolled.

At operation 222, SaaS management platform 120 can provide information for one or more GUIs of the workspace. The GUIs can permit the user of client device 111 to view and modify contents, such as configurable parameters of the IDO 140 (e.g., user-defined IDO data). The GUIs can allow the user to populate the IDO with IDO data with baseline data that can be used with a contained IDO 141 for modeling outcomes of new services. The GUIs of the workspace can permit the user to modify user-defined IDO data such as select or define one or more benefit groups (e.g., a group of employees that share access to specific benefit offerings under a benefit plan), select one or more available new services (e.g., benefit plans for future years), map current services to new services (e.g., map current benefit plans with new benefit plans that offer similar features), as well as provide additional data. GUIs 300B through 300E of FIGS. 3B through 3E illustrate GUIs of client device 111 that permit the viewing and modification of IDO data (e.g., using user-defined IDO data).

At operation 224, SaaS management platform 120 can receive from client device 111 user-defined IDO data. For example, the user of client device 111 can modify one or more parameter values pertaining to current benefit plans and/or proposed benefit plans. The IDO 140 can be updated with the user-defined IDO data, as noted above. In some embodiments, the user-defined IDO data can include the selection of one or more employee identifiers for subscriber entity 130. In some embodiments, the collection of user-defined IDO data can be obtained through a series of GUIs that guide the user of client device 111 in providing the user-defined IDO data. In some embodiments, the user-defined IDO data can include a selection of one or more benefit groups. A benefit group can refer to a subset of employee or plan participants within an entity that share the same or similar eligibility structure and/or benefit options under a benefit plan. In some embodiments, the user-defined IDO data can include a selection of one or more benefit plans or coverage types. In some embodiments, the user-defined IDO data can include an indication of plan mapping that maps the current year benefit plans (e.g., previous services) with new benefit plans (e.g., new services). In some embodiments, the user-defined IDO data can include additional cost data. In some embodiments, the user-defined IDO data can identify additional collaborators of the IDO 140. GUIs 300B through 300E of FIGS. 3B through 3E include additional information directed to user-defined IDO data.

At operation 226, SaaS management platform 120 can update the IDO 140 with the user-defined IDO data. In some embodiments, the SaaS management platform 120 saves the data to the IDO 140. In some embodiments, the SaaS management platform 120 performs internal logic (e.g., IDO logic) based at least in part on the user-defined IDO data and updates various parameters and/or parameter values based on the user-defined IDO data.

At operation 228, SaaS management platform 120 provides information for the GUI of the workspace based on the user-defined IDO data. In some embodiments, the information is updated in real-time. For example, as the derived data for non-configurable parameters that is derived from changes to the configurable parameters can be updated in real-time in the GUI.

At operation 230, client device 111 can send request to save the IDO 140. In some embodiments, the request can include a request to review information of the IDO 140. In some embodiments, the request to review information of the IDO 140 is sent in a separate request.

Figure 3D:
FIG. 3A-3T illustrate graphical user interfaces (GUIs) of a workspace used in a workflow to collaboratively model outcomes for one or more service, in accordance with some embodiments of the disclosure.
Figure 3E:
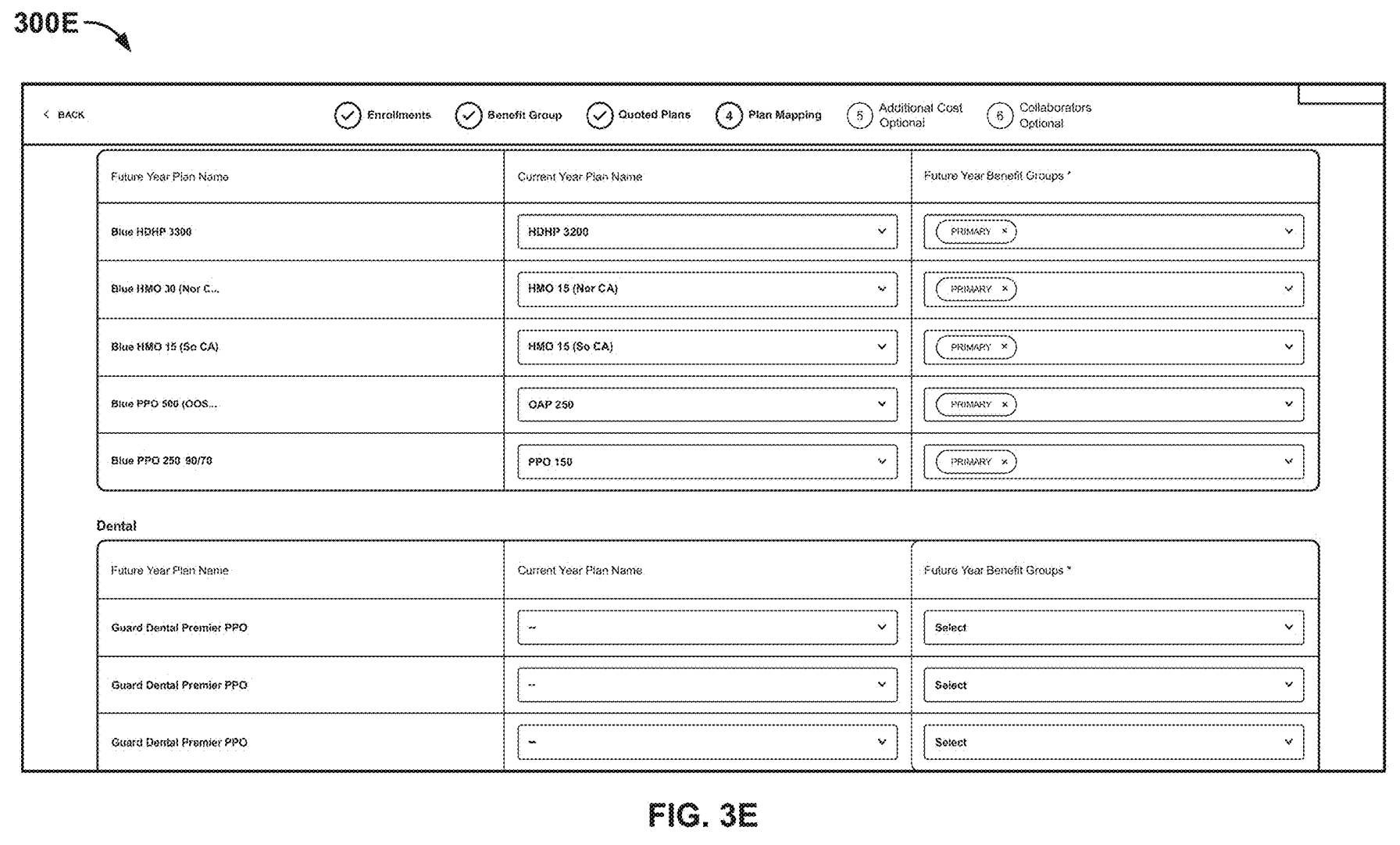
Figure 3F:
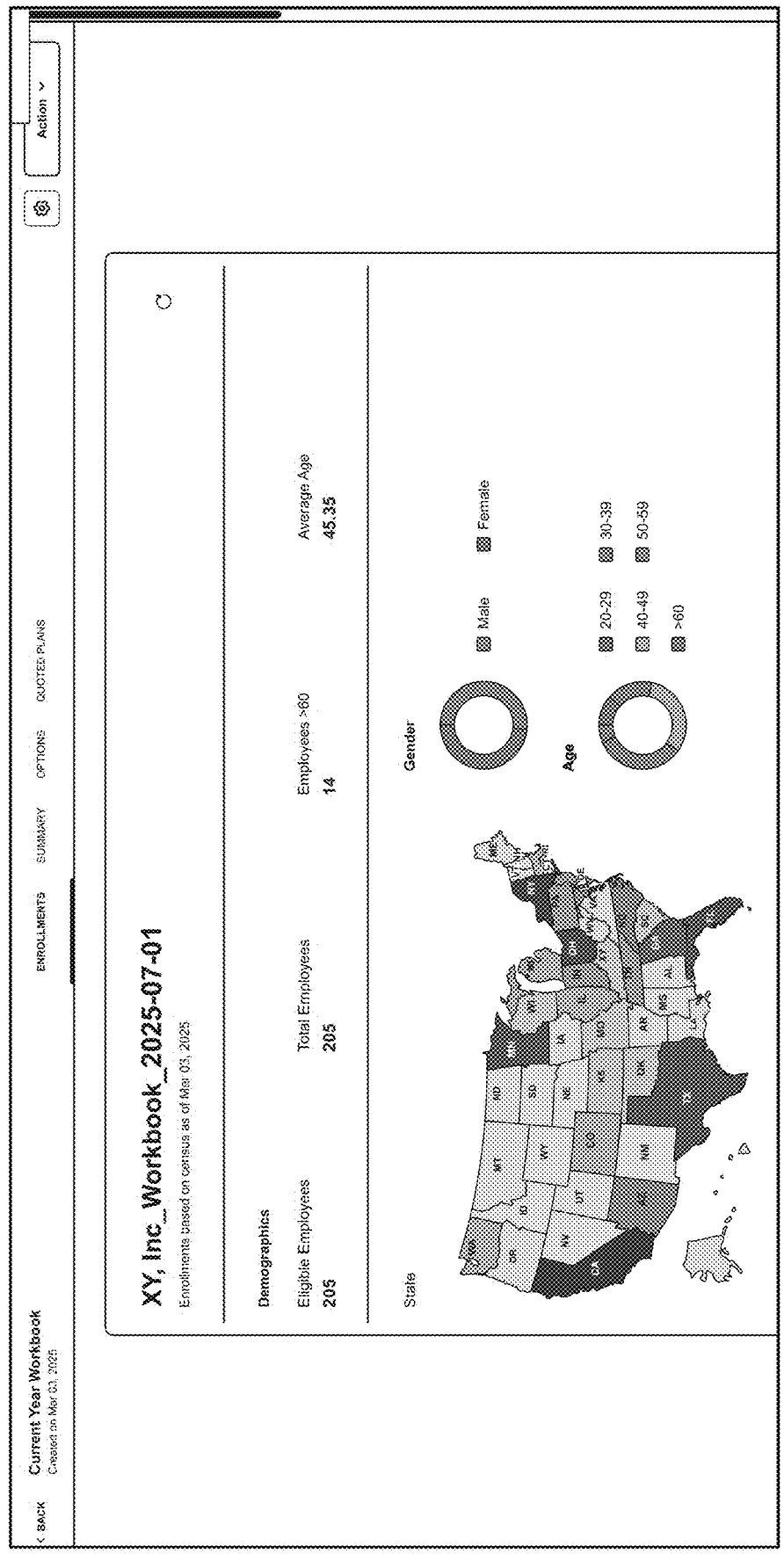
Figure 3G:
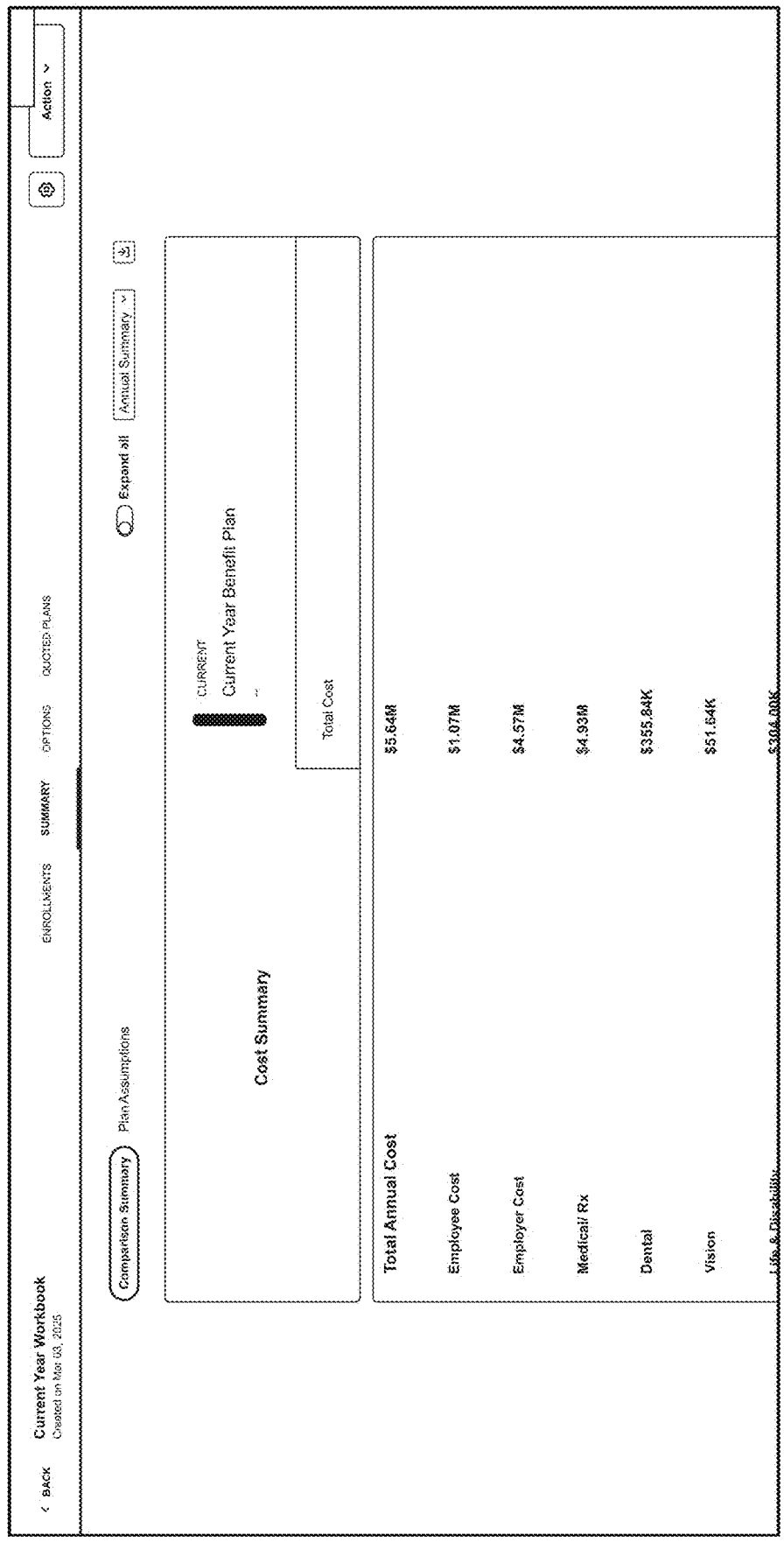

At operation 232, SaaS management platform 120 can provide information for the GUI of the workspace that reflects the information of the IDO 140. GUIs 300F and 300G of FIGS. 3F and 3G illustrate examples of GUIs displayed at client device 111 the reflect the information of the IDO 140. In some embodiments, the information of the IDO 140 can include summary of demographics related to the current or previous services consumed by the subscriber entity.

At operation 234, SaaS management platform 120 can automatically generate one or more container IDOs (e.g., auto-generated container IDOs). In some embodiments, the one or more auto-generated IDO containers can generate outcomes for one or more new services using assumed or predicted values for one or more configurable parameters of the contained IDO (e.g., without user-defined container data). Additional information about auto-generated IDO containers is provided with respect to FIG. 3N (e.g., GUI 300N).

Figure 3H:
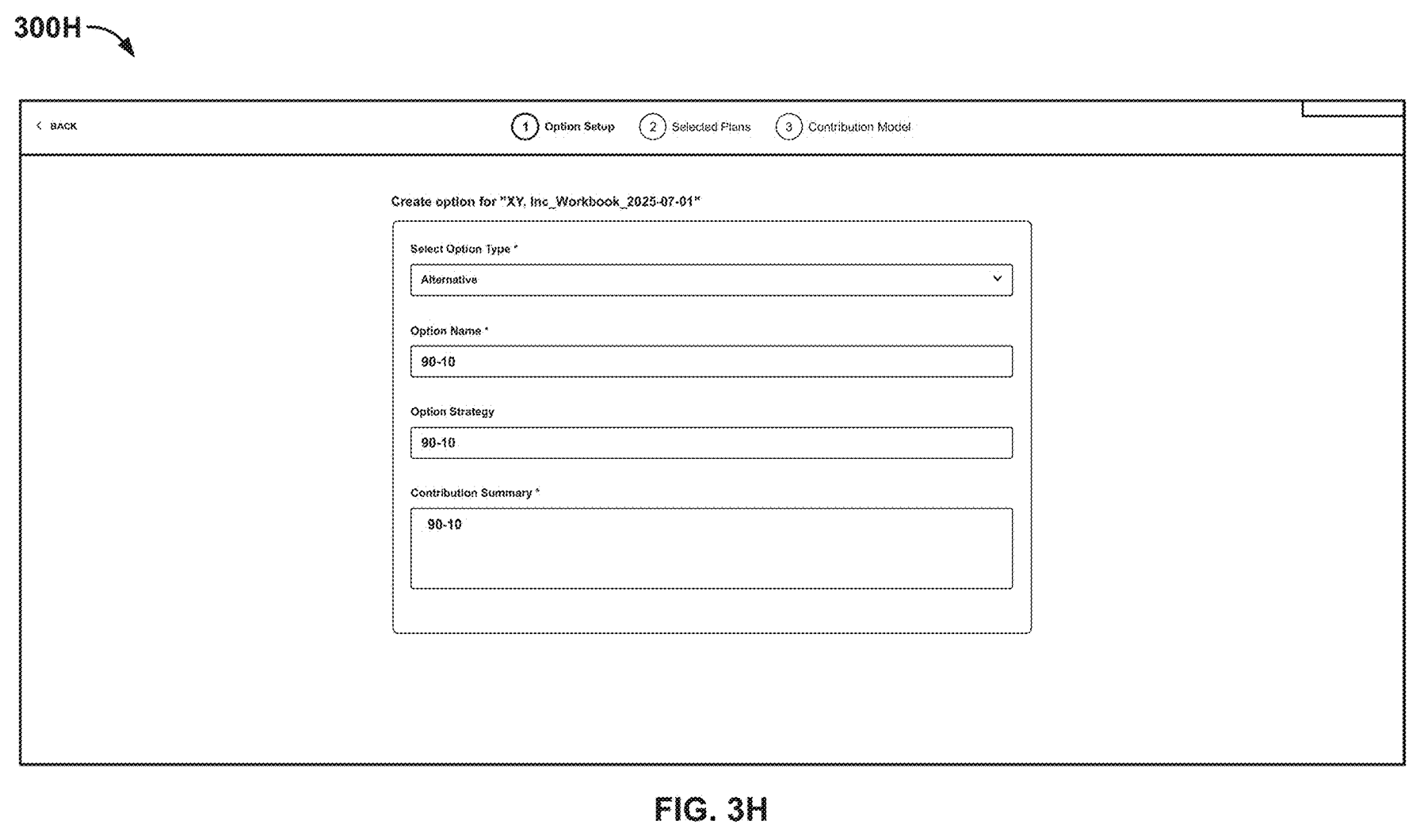

At operation 236, client device 111 sends to SaaS management platform 120 a request to create a contained IDO 141. The contained IDO 141 can be contained in the IDO 140. As noted, IDO 140 can pertain to a particular subscriber entity. In some embodiments, the contained IDO can derive data using the IDO data (e.g., user-defined IDO data and/or non-user defined IDO data) and store the derived data (e.g., contained data, also referred to as "contained IDO data" herein) without altering the IDO data of IDO 140. In some embodiments, the contained IDO 141 can permit the user to collaboratively model outcomes corresponding to one or more new services provided by one or more third-party service providers to a subscriber entity based on one or more configurable parameters. In some embodiments, the contained IDO 141 (and/or IDO 140) is created on behalf of subscriber entity 130. GUI 300H of FIG. 3H illustrates an interface to request a creation of contained IDO 141.

At operation 238, SaaS management platform 120 generates and stores the contained IDO 141 based on the request from client device 111.

Figure 3I:
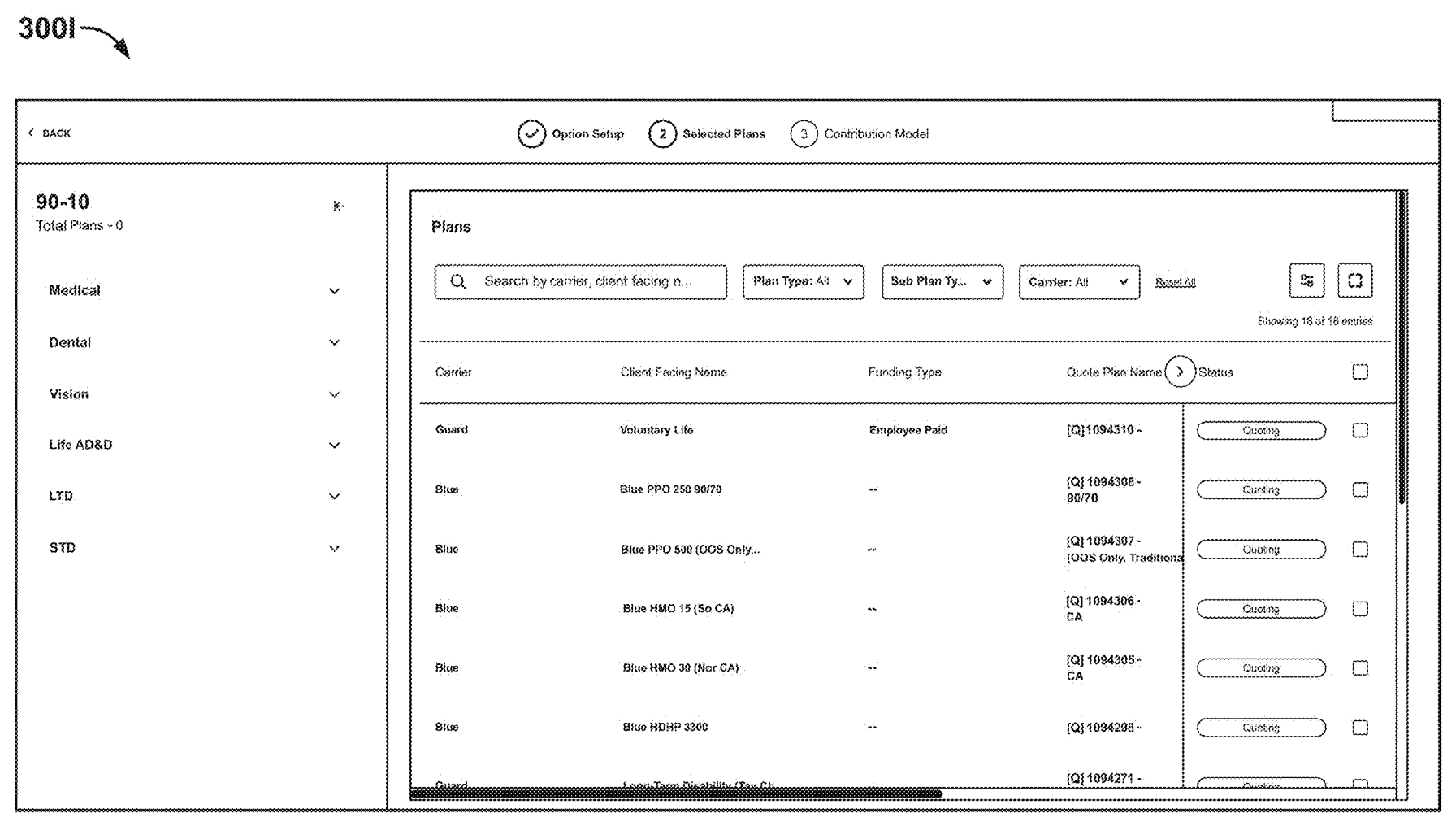
Figure 3L:
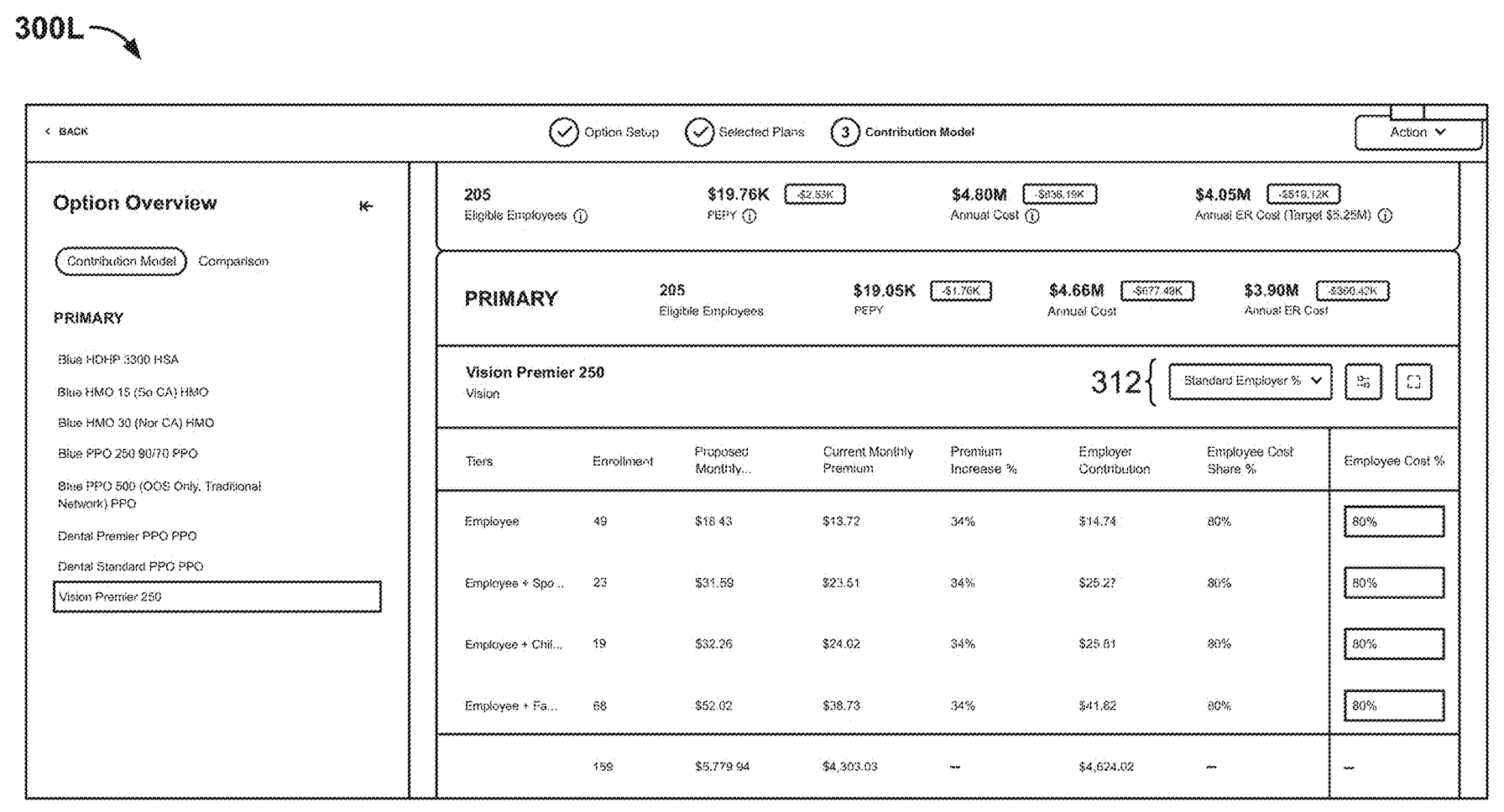

At operation 240, SaaS management platform 120 can provide information for the GUI of the workspace that reflects the information of the contained IDO 14. In some embodiments, the GUIs can permit the user of client device 111 to modify or edit one or more parameter values for one or more configurable parameters. GUIs 300I through 300M of FIGS. 3I through 3D illustrate example interfaces the permit the viewing and modification of parameter values of one or more configurable parameters of the contained IDO 141.

At operation 242, client device 111 sends user input identifying a selection of one or more new services (e.g., next year's services) using the one or more of GUIs. In some embodiments, the selected one or more new services are selected among services selected for the IDO 140 (e.g., user-defined IDO data of operation 224). The selection of one or more services for the contained IDO 141 can be included in the user-defined contained data. Additional information regarding selected services of the contained IDO 141 is further described with respect to GUI 300I of FIG. 3I.

At operation 244, client device 111 sends user-defined contained data including contribution data to the SaaS management platform 120 using the GUI of the workspace. GUIs 300J through 300M of FIGS. 3J through 3M illustrated GUIs of the workspace that permit a user of client device 111 (and/or end user device 131) to modify configurable parameters to change parameters values for the contained IDO 141. The parameters values can include contribution data pertaining to the new services. The contained IDO 141 can model outcomes for the new services based at least in part on the user-defined contained data.

At operation 246, SaaS management platform 120 receives the user-defined contained data (e.g., from operation 242 and operation 244) and updates the contained IDO 141. In some embodiments, SaaS management platform 120 can perform a modeling operation using model logic and the one or more parameter values to update the contained IDO to reflect one or more outcomes. For example and in some embodiments, the IDO and/or contained IDO 141 can include logic that evaluates one or more or user-defined contained data, non-user defined contained data, IDO data to determine results of the one or more new services. Each of the services (e.g., benefit plan) and sub-services (e.g., coverage type) can have different outcomes that are evaluated based on the user-defined parameter values. In some embodiments, the model logic can compare previous services with the new services to generate comparison data that can be provided for display at client device 111. In some embodiments, the GUIs of the workspace can be updated in real-time to reflect changes in the modified parameters values as well as other parameters values affected by the modified parameter values.

At operation 248, SaaS management platform 120 can provide information for the GUI of the workspace that permits the user of client device 111 to save and or publish the IDO 140 and/or contained IDO 141.

Figure 3N:
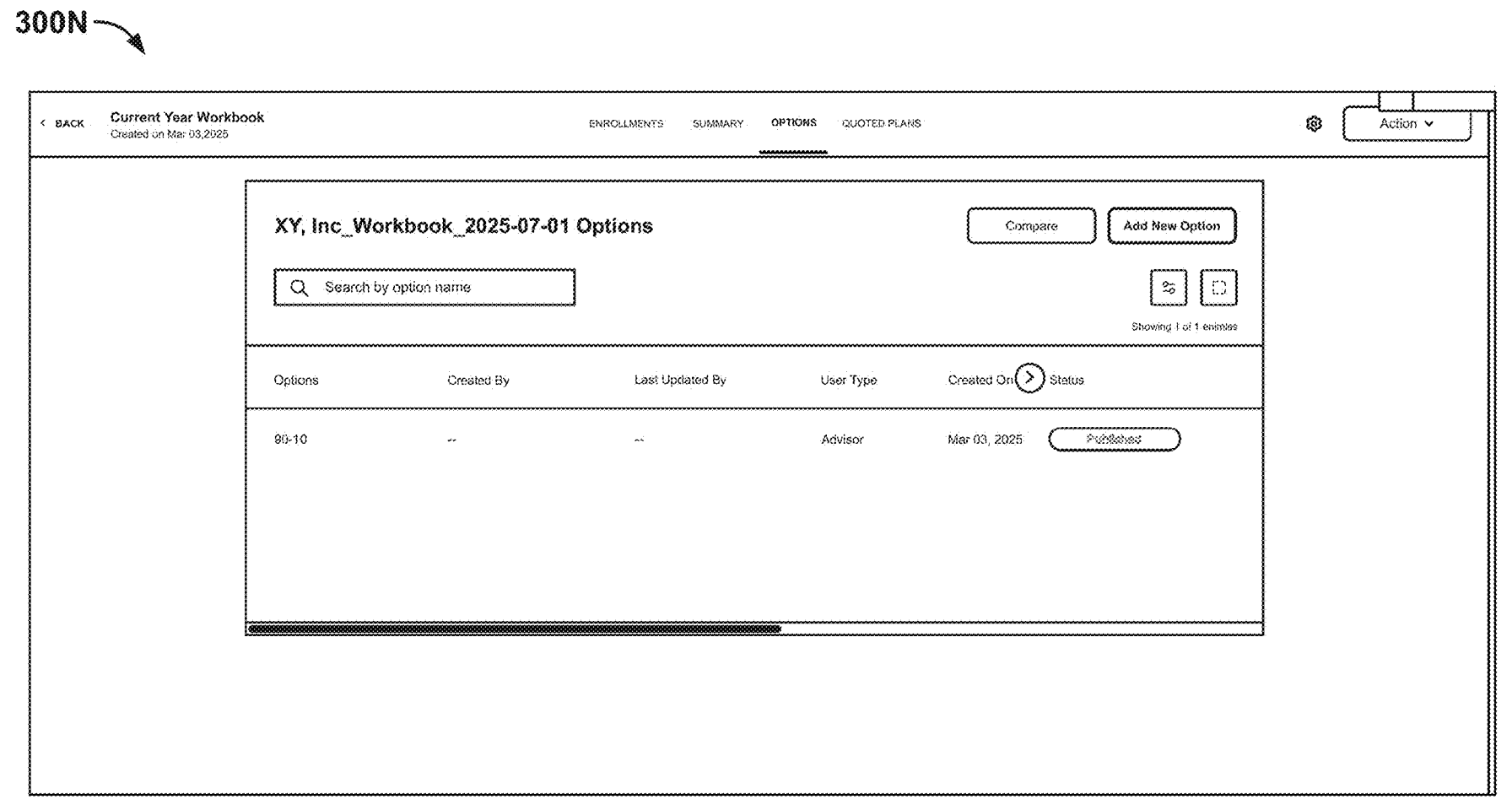

At operation 250, client device 111 can save and/or publish the IDO 140 and/or contained IDO 141. In some embodiments, publishing the IDO 140 will also publish the contained IDO 141 as the IDO 140 publishes with all contents. GUI 300N of FIG. 3N illustrates an interface indicating that an IDO has been published. Publish can refer to making the IDO (and/or contained IDO) accessible to another party via a service or platform, such as the SaaS management platform 120. In some embodiments, the published IDO can remain hosted by the SaaS management platform 120 rather than transferred to end user device 131 using a copy. In some embodiments, the SaaS management platform 120 can enforce access control on the published IDO and/or contained IDO. For instance, access to a published IDO can be granted only to end user accounts that have appropriate authorization.

Moving to diagram 201 of FIG. 2B where the operations continue.

At operation 252, SaaS management platform 120 can send to the end user device 131 a notification indicating that information pertaining to the IDO 140 and/or contained IDO 141 is available to the end user. For example, the SaaS management platform 120 can send an email indicating that the published IDO 140 is ready for review.

At operation 254, end user of end user device 131 can log in to SaaS management platform 120 using one or more credentials. Operation 254 is similar to operation 210 and the description of operation 210 can apply to operation 254, unless otherwise advised.

At operation 256, SaaS management platform 120 can authenticate the end user and determine whether the user account associated with the end user is authorized to access the workspace. Operation 256 is similar to operation 212 and the description of operation 212 can apply to operation 256, unless otherwise advised.

At operation 258, SaaS management platform 120 sends to end user device 131 information to render the GUI of the workspace interface at end user device 131. GUI 300O of FIG. 30 illustrates an example of a GUI of a workspace for the subscriber entity 130, and in particular the end user of end user device 131 to view, edit and/or model outcomes to one or more new services provided by one or more third-party service providers 135.

At operation 260, end user of end user device 131 can use the GUI, such as GUI 300O of FIG. 30, to select a particular IDO 140. In some embodiments, one or more IDOs are available for selection. It can be noted that although only a single IDO 140 is illustrated in GUI 300O, multiple IDOs may be available for selection and/or review in some embodiments.

At operation 262, SaaS management platform 120 sends to end user device 131 information to render the GUI of the workspace at end user device 131. The GUI can provide the end user device 131 with an interface for reviewing and interacting with information related to IDO 140.

At operation 264, end user device 131 can send to SaaS management platform 120 a request for information related to the contained IDO 141. In some embodiments, the GUI described respect to operation 262 can be used to select the contained IDO 141 among one or more contained IDOs contained in IDO 140.

Figure 3Q:
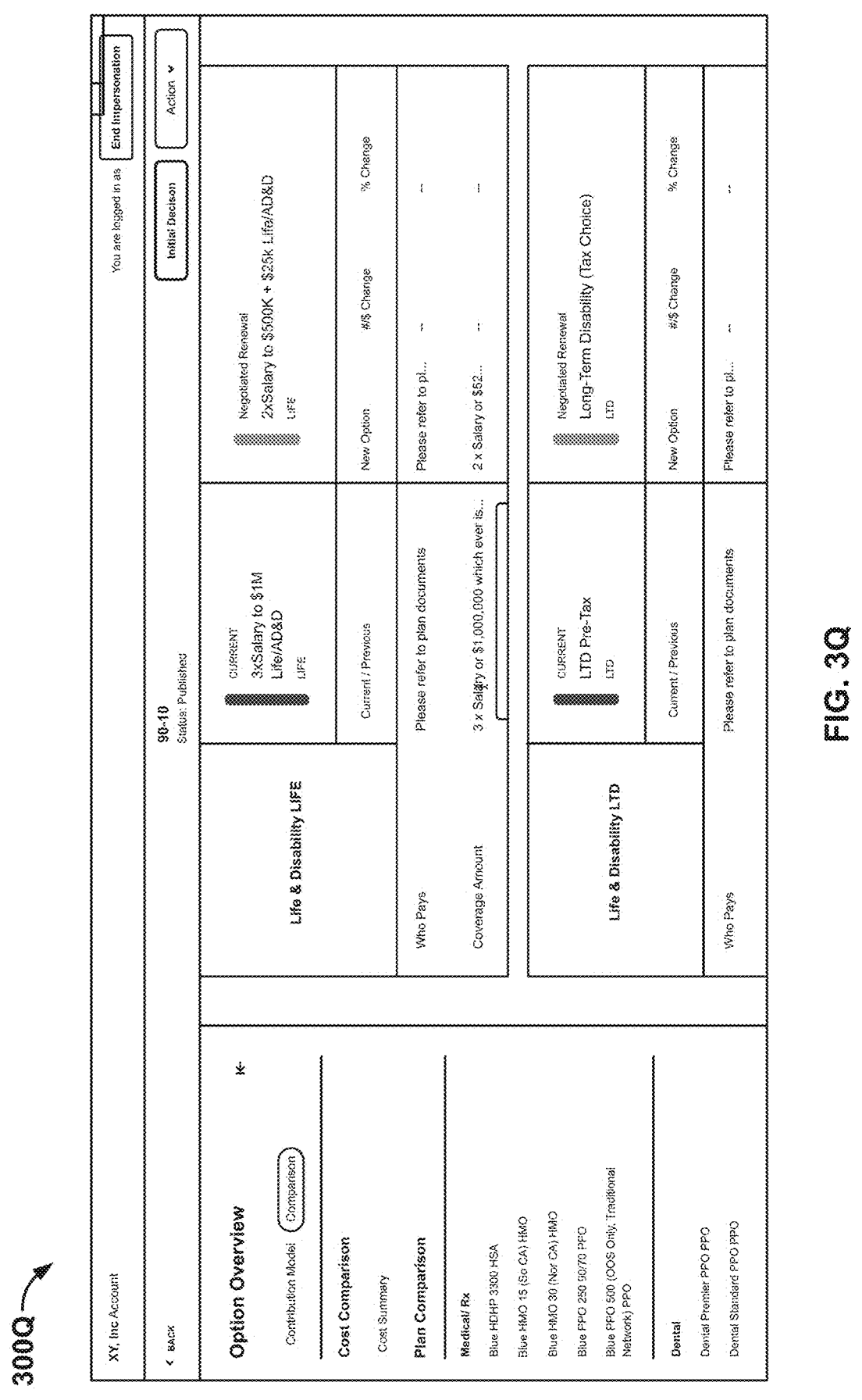

At operation 266, SaaS management platform 120 provides information pertaining to the contained IDO 141 to end user device 131 for display at a GUI of end user device 131. The information can pertain to a summary of outcomes of new services selected for the contained IDO 141. Examples of the information related to the contained IDO 141 is illustrated in GUI 300P and GUI 300Q of FIGS. 3P and 3Q. The description corresponding to FIGS. 3P and 3Q can apply to operation 266, unless otherwise advised.

At operation 268, end user of end user device 131 has the option via a GUI to approve the contained IDO 141. For example, the end user can review the summary of the information pertaining to the contained IDO 141 and determine that the outcomes are acceptable and proceed to implement the one or more new services identified in contained IDO 141. The end user can use the GUI to approve the one or more new services identified in the contained IDO 141. In some embodiments, the one or more new services can in whole or in part be the from the same third-party service providers that provide the one or more previous services. In some embodiments, the one or more new services can in whole or in part be provided by different third-party service providers than provide the previous services.

At operation 270, SaaS management platform 120 can provide a notification to client device 111 indicated that the subscriber entity 130 has approved the contained IDO 141. For instance, the indication can identify that the one or more new services identified in the contained IDO 141 and the proposed parameter values have been approved by the subscriber entity 130.

At operation 272, client device 111 can send to third-party service providers 135 an indication of the approval by subscriber entity 130 of the one or more new services. In some embodiments, additional information can be sent to the third-party service providers 135 such as some of the user-defined contained data (e.g., employer and employee contribution information). In some embodiments, the client device 111 can send the notification directly to the third-party service providers 135. In other embodiments, client device 111 can send the notification to SaaS management platform 120 and SaaS management platform 120 can relay the information to third-party service providers 135. In some embodiments, the end user does not approve contained IDO 141 and no notification of approval is sent by end user device 131 to SaaS management platform 120.

Figure 3R:
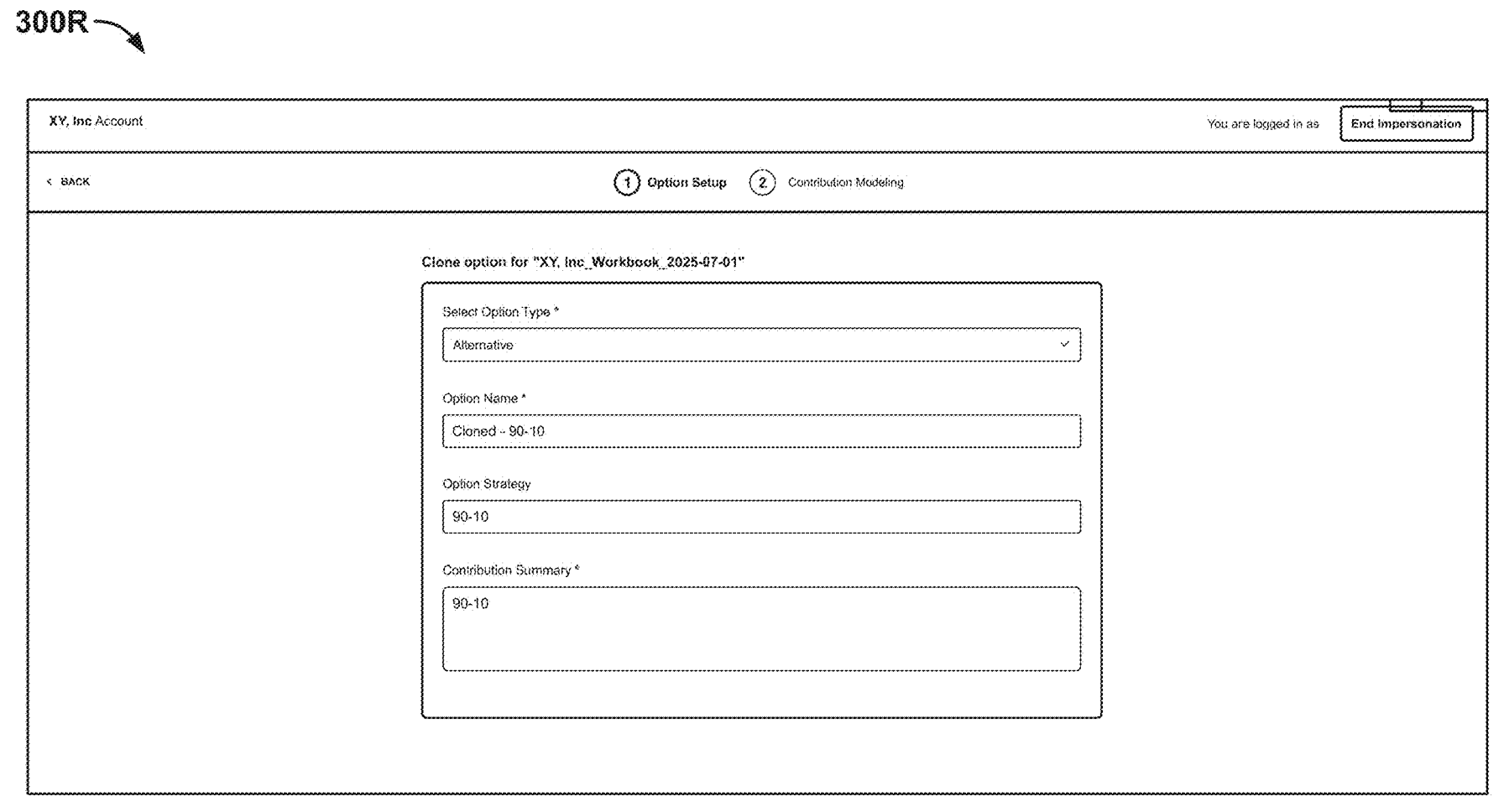

At operation 274, end user device 131 sends a request to SaaS management platform 120 to duplicate the contained IDO 141. In some embodiments, duplicate contained IDO may be another contained IDO that is contained in IDO 140. In some embodiments, the duplicate contained IDO can be used by the end user to modify configurable parameters (e.g., change parameter values of the configurable parameters) without changing the IDO data or the contained IDO data (e.g., user-defined contained data and/or non-user defined contained data). The duplicate contained IDO data can be used by the end user to model alternative outcomes of new services using user-defined parameter values defined by the end user rather than the user of client device 111. GUI 300R of FIG. 3R represents an example interface displayed at end user device 131 that permits the end user to request a duplicate of contained IDO 141 (e.g., "90-10").

At operation 276, SaaS management platform 120, responsive to the request, can generated the duplicate contained IDO and store the duplicate contained IDO with the IDO 140. In some embodiments, the data of the duplicate contained IDO can include duplicate contained data. The duplicate contained data can include user-defined duplicate contained data and/or non-user defined duplicate contained data. The initial data of the duplicate contained IDO can reflect the data of the contained IDO 141 (e.g., contained data).

Figure 3S:
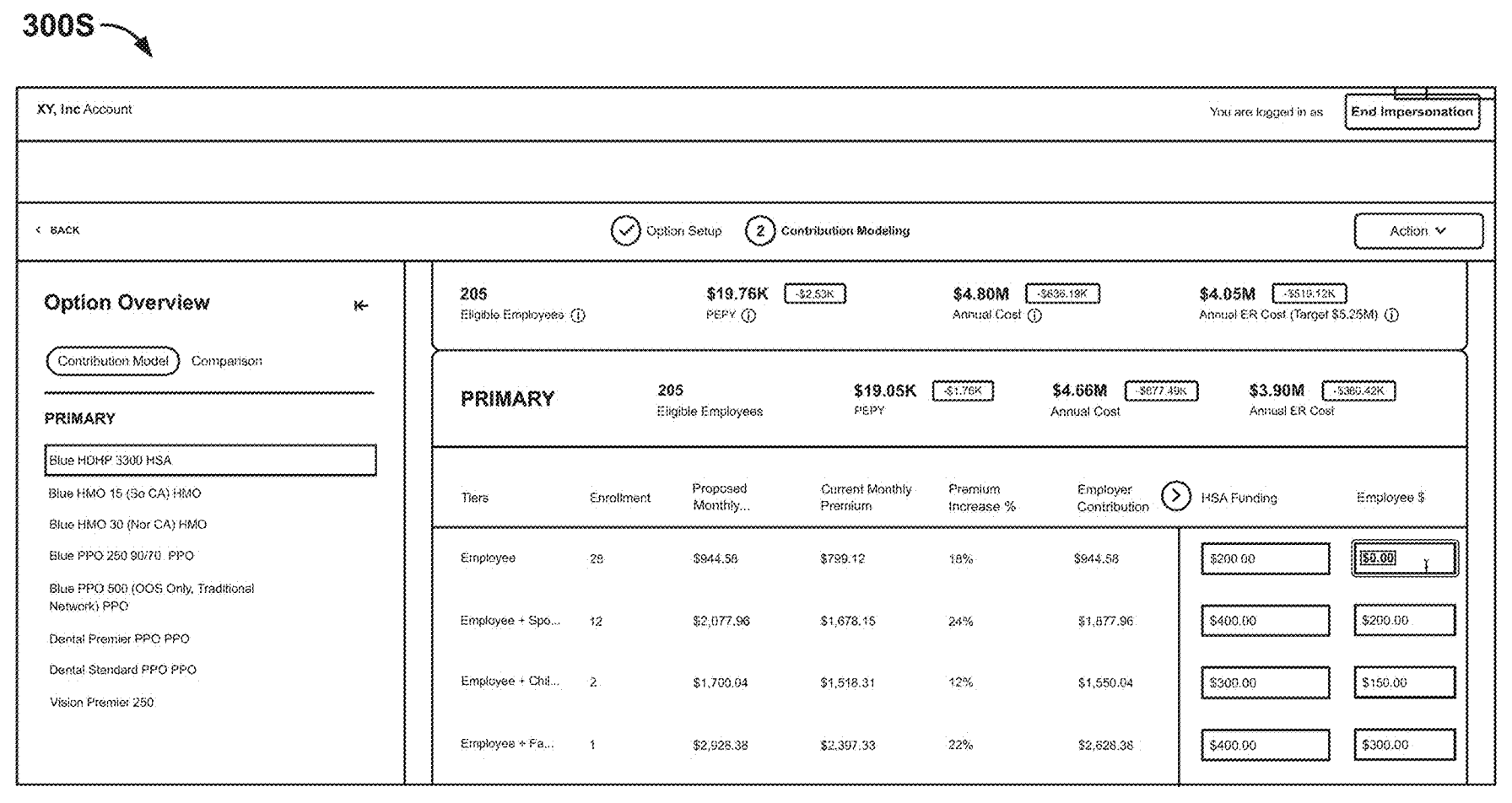

At operation 278, SaaS management platform 120 can provide end user device 131 information for the GUI of the workspace that reflects the information of the duplicate contained IDO. In some embodiments, the GUIs can permit the end user of end user device 131 to modify or edit one or more parameter values for one or more configurable parameters of the duplicate contained IDO. The GUI 300S of FIG. 3S illustrates and example interface displayed at the end user device 131 the permits the end user to modify parameter values of configurable parameters. The GUIs provided to view and modify the configurable parameters of duplicate contained IDO can be similar to those GUIs provided to client device 111 to modify the contained IDO 141. The description of GUIs 300I through 300M of FIGS. 3I through 3D (and the GUIs themselves) can apply to GUIs for modifying configurable parameters of the duplicate contained IDO, unless otherwise described.

At operation 280, end user device 131 sends user input identifying a selection of one or more new services (e.g., next year's services) using the one or more of GUIs. In some embodiments, the selected one or more new services are selected among services selected for the IDO 140 using (e.g., operation 224). In some embodiments, the selected one or more new services are selected among services selected for the contained IDO 141 (e.g., operation 242). In some embodiments, the end user keeps the services selected for the contained IDO 141. The selection of one or more services for the duplicate contained IDO can be included in the user-defined duplicate contained data (also referred to as "user-defined duplicate contained IDO data" herein). The information regarding the selected services of the duplicate contained IDO can be similar to that described with respect to GUI 300I of FIG. 3I.

At operation 282, end user device 131 sends user-defined duplicate contained data including contribution data to the SaaS management platform 120 using the GUI of the workspace. GUI 300S of FIG. 3S illustrates and example interface displayed at the end user device 131 the permits the end user to modify contribution data. Additional GUIs can also be provided to user-defined duplicate contained data using GUIs similar to GUI 300I through 300M of FIGS. 3I through 3D. The parameters values can include contribution data pertaining to the new services.

At operation 284, SaaS management platform 120 receives the user-defined contained data (e.g., from operation 280 and operation 282) and updates the duplicate contained IDO accordingly. In some embodiments, SaaS management platform 120 can perform another modeling operation (e.g., configuration modeling) using the model logic and the one or more alternative parameter values to update the first duplicated contained IDO reflecting alternative outcomes. In some embodiments, the modeling operation can be the same or similar to the modeling operation described with respect to operation 246 but for the modeling operation uses the duplicate contained data, and in particular the user-defined duplicate contained data to model outcomes for the new services of the duplicate contained IDO.

At operation 286, SaaS management platform 120 can provide to end user device 131 information for the GUI of the workspace that permits the user of client device 111 to save and/or send for review duplicate contained IDO and/or save and/or approve the contained IDO 141.

At operation 288, saves the duplicate contained IDO and submits the duplicate contained IDO for review by client entity 110. GUI 300T of FIG. 3T illustrates an example GUI where the end user has approved the contained IDO 141 and sent for review the duplicate contained IDO (e.g., "Cloned—90-10").

At operation 290, SaaS management platform 120 sends to client device 111 an indication that the duplicate contained IDO has been created and is ready for review. In some embodiments, the client device 111 can review the duplicate contained IDO and create another duplicate IDO that duplicates the duplicate contained IDO and modify the other duplicate IDO in a similar manner as described with respect to operations 274 through 286. In some embodiments, the user of client device 111 can complete the review of duplicate contained IDO and submit it for approval by subscriber entity 130. In such embodiments, one or more operations 258 through 288 may be performed.

Figure 3T:
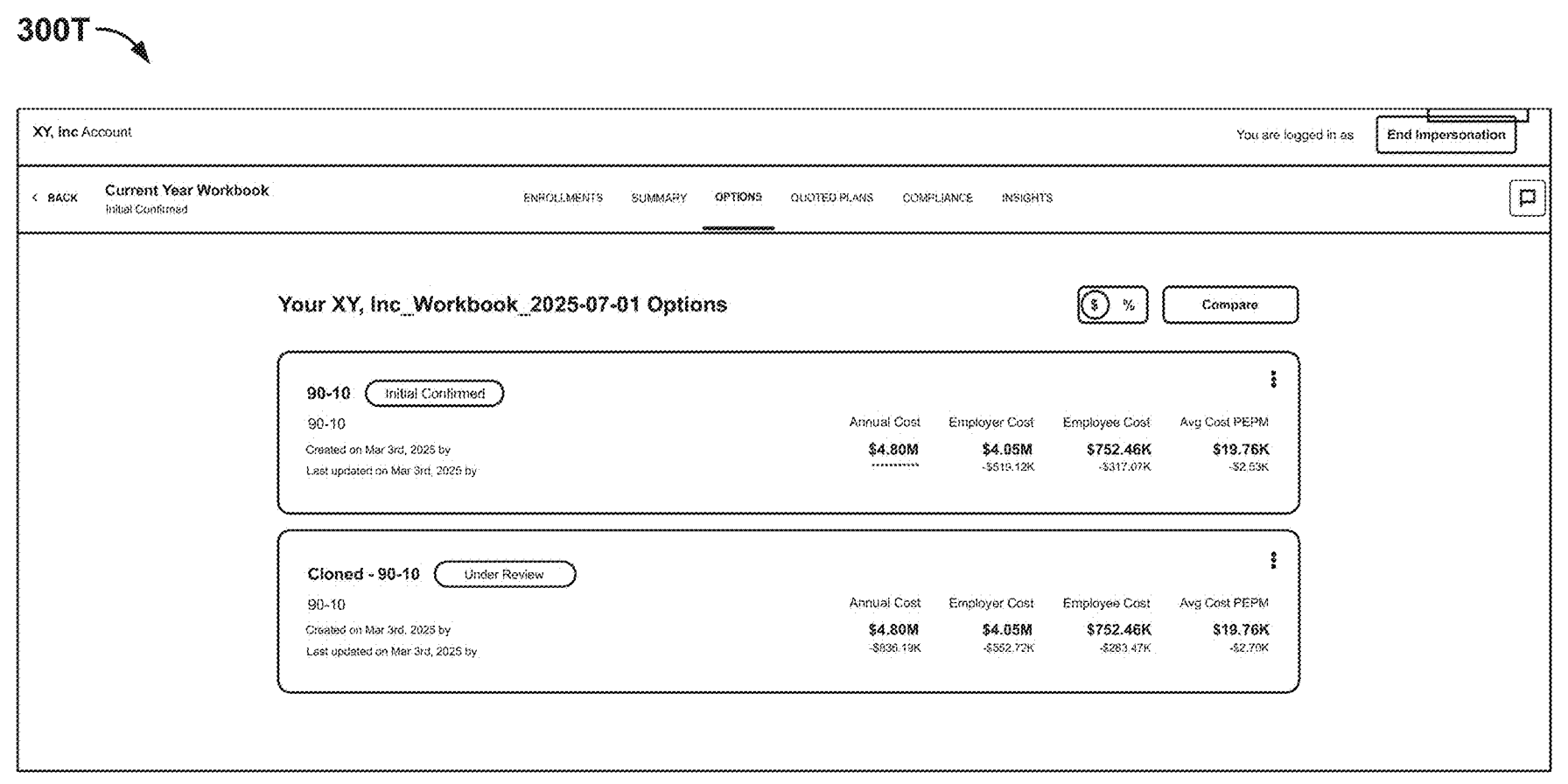

FIG. 3A-3T illustrate graphical user interfaces (GUIs) of a workspace used in a workflow to collaboratively model outcomes for one or more service implementations, in accordance with some embodiments of the disclosure. GUIs 300A through 300T (generally referred to as "GUI(s) 300" herein) can be rendered by client device 111 of client entity 110 or end user device 131 of subscriber entity 130 based on information received from SaaS management platform 120. Elements of FIG. 1-2B are used with respect to FIG. 3A-3T to help describe features of GUIs 300. The operations and GUI elements described with respect to FIG. 3A-3T are shown to be performed serially for the sake of illustration, rather than limitation. Although shown in a particular sequence or order the order of the operations and/or GUIs can be modified, unless otherwise specified. Thus, the illustrated embodiments should be understood only as examples, and the illustrated operations and/or GUIs can be performed in a different order, while some operations and/or GUIs can be performed in parallel. Additionally, one or more operations and/or GUIs can be omitted in some embodiments. Thus, not all illustrated operations and/or GUIs are required in every embodiment, and other process flows are possible. In some embodiments, the same, different, fewer, or greater operations and/or GUIs can be performed. In some embodiments, a service can include a benefit plan or the component plans thereof (e.g., medical plan, dental plan, vision plan, etc.).

GUI 300A of FIG. 3A illustrates a GUI displayed at client device 111 responsive to logging into the workspace of SaaS management platform 120. The GUI is configured to permit the user of client device 111 to select among one or more subscriber entities 302 associated with the client entity 110. Although a single end user entity (e.g., XY, inc.) is illustrated, one or more subscriber entities can be displayed. In some embodiments, the user can select a particular entity, among the subscriber entities 302 to begin the workflow for the particular entity. The selection of a subscriber entity can initiate a creation of an IDO, such as a workbook, for the selected subscriber entity.

GUIs 300B through 300E of FIG. 3B through 3E illustrate the workflow to receive information pertaining to the selected subscriber entity, which can be used as information for the IDO (e.g., user-defined IDO data). In some embodiments, GUIs 300B through 300E are displayed at the client device 111 and permit the user of client device 111 to select one or more options. In some embodiments, a user of client device 111 can provide (user input) user-defined IDO data pertaining to the subscriber entity and one or more new services for the subscriber entity. In some embodiments, the IDO data can include one or more of user-defined IDO data and non-user defined IDO data.

GUI 300B illustrates enrollment information 304 (e.g., current enrollment information) in columns showing the employee information (e.g., employee name and home location), the benefit plan name (e.g., plan name), benefit group to which the employee belongs (e.g., benefit group), department to which the employee belongs (e.g., department), the benefit plan coverage level (e.g., coverage level), the type of employee, the number of dependents of the employee, monthly employer cost, and monthly employee cost. The illustrated enrollment information 304 is shown for the current medical plans (e.g., current year's plans). Enrollment information 304 for other benefits such as dental and vision can be displayed with the selection of option GUI element 306.

GUI 300C illustrates the selection options for a benefit group. A benefit group can refer to a subset of employee or plan participants within an entity that share the same or similar eligibility structure and/or benefit options under a benefit plan. For example, a benefit group can include full-time employees that share the same benefit options, such as the same medical, dental and vision plans. Part-time employees may be a different benefit group that share benefit options that are different than the benefit options of full-time employees.

In some embodiments, GUI 300C can allow user of client device 111 to select the particular benefit groups among one or more benefit groups 308 that are to be included in the IDO. The benefit group(s) 308 reflect the current benefit groups of the subscriber entity. In the current example, only a single benefit group (e.g., primary) is illustrated. In other embodiments, multiple benefit groups pertaining to the subscriber entity 130 can be shown and/or selected.

GUI 300D illustrates the benefit plans 310 available to the subscriber entity. The benefit plans can include new benefit plans, for example new benefit plans for the next fiscal year. In some embodiments, GUI 300D can allow a user to select the particular benefit plans that are to be part of the IDO. In some embodiments, the selected plans will be used to evaluate outcomes (e.g., contribution modeling) using a contained IDO. GUI 300D illustrates medical plans and can be used to view all or any benefit plans. In some embodiments, the benefit plans available for selection are the benefit plans for which services data has been received and uploaded (e.g., operation 204 and operation 206 of FIG. 2A).

GUI 300E illustrates an interface that allows the user of client device 111 to map current benefit plans with new benefit plans. In some embodiments, enrollment in a benefit plan can be cyclical such that a subscriber entity selects new plans every year, for example. The plan mapping feature permits a user to logically link a future year plan with a current year plan. The plan mapping feature can also allow the user to select a benefits group to linked with the future benefit plans. In some embodiments, the future year benefit plans are plans selected in GUI 300D. The plan mapping feature illustrates mapping for medical plans and dental plans. It can be appreciated that the plan mapping feature can be used for any coverage types (e.g., vision, LTD, etc.) of a benefit plan. In some embodiments, at least some of the benefit plans for the current year and future year can be from the same third-party service provider. In some embodiments, at least some of the benefit plans for the current year and future year can be from different third-party service providers.

Although not illustrated, the workspace can provide additional GUIS that allow for the input of additional user-defined IDO data such as additional cost data (e.g., 401 (K) plans, wellness programs, etc.) and additional collaborators for the IDO.

GUI 300F can illustrate a graphical representation of the IDO data. In some embodiments, the IDO can be saved and reviewed using at least GUI 300F. In some embodiments, GUI 300F provides one or more visual elements that represent the enrollment data for the subscriber entity. GUI 300F represents the GUI displayed at client device 111.

GUI 300G illustrates a summary of the IDO data. In particular, GUI 300G shows the cost summary for the current year benefit plans. GUI 300G represents the GUI displayed at client device 111.

GUI 300H illustrates a GUI that permits the user of client device 111 to create a contained IDO titled "90-10." In some embodiments, subsequent to saving the IDO, the review GUIs (e.g., GUI 300F and 300G) can provide an interface to create a contained IDO for the IDO. For example, an option or worksheet can be created and contained in the workbook.

GUIs 300I through 300M illustrate examples of user-defined contained data of the contained IDO. Subsequent to creating the contained IDO, the workspace can provide one or more GUIs that allow a user to modify the contained IDO to provide user-defined contained data for the contained IDO. In some embodiments, the user of client device 111 can modify one or more parameter values for configurable parameters of the contained IDO. In some embodiments, the configurable parameters can include new services and/or contribution data pertained to the one or more new benefit plans.

For example, GUI 300I illustrates an interface that allows the user of client device 111 to select one or more new benefit plans (e.g., future year's benefit plans) for the contained IDO. The user of client device 111 can select among the benefit plans that were originally selected for the IDO at GUI 300D of FIG. 3D. Using the benefit plans that were selected for the IDO is an example of the contained IDO using the IDO data without making changes to the IDO data. In some embodiments, the user of client device 111 can select one or more of the available benefit plans to be included in the contained IDO. Although medical plans are illustrated, in some embodiments plans of any coverage types of the benefit plans (e.g., medical, dental, vision, life, LTD and STD) can be selected using GUI 300I. In some embodiments, the one or more selected benefit plans can be part of the user-defined contained data.

GUI 300J illustrates an interface that allows a user of client device 111 to change enrollment pertaining to a benefit plan (e.g., as part of contribution data). For example, the configurable parameters include enrollment percentage and the different coverage tiers, such as employee only (EE), employee and spouse (ES), employee and children (EC), and employee and family (EF). A coverage tier can refer to a specific enrollment option available within a benefit plan determining the individuals that are covered under the selected plan.

GUI 300K illustrates an interface that allows a user of client device 111 to change or define the employer and/or employee contribution (e.g., also referred to a contribution data) to each coverage type among the benefit plans selected by the user of client device 111. In some embodiments, the GUI 300K can permit the user of client device 111 to change or define the employer and/or employee contribution to each coverage tier of each plan, as illustrated. Also as illustrated, the GUI 300K provides the option to define the employer and/or employee contribution as a defined dollar amount that can be independent from the premium amount. For example and as illustrated, for the employee and child coverage tier, the user has defined a flat amount as $150 as the employees' flat monthly amount. In some embodiments, values of other parameters (e.g., employee cost share %, annual cost, annual ER cost, etc.) can be dynamically adjusted to reflect changes to parameter values of configurable parameters.

GUI 300L illustrates an interface indicating the user of client device 111 has selected a particular plan (e.g., "vision premier 250") to adjust the contribution data for the particular plan. In some embodiments, the contribution data of the employer and/or employee may be modified. For example, the employee cost percentage has been modified to 80 percent for all coverage tiers.

In some embodiments, the contribution strategy can also be modified. For example and as illustrated, GUI element 312 can be used to adjust the contribution strategy. The elected contribution strategy in the current example is standard employer percentage. In some embodiments, the selectable contribution strategies can include standard employer percentage, non-standard employer percentage, flat employer amount, and flat employee amount. In the standard employer percentage the employer contributes a percentage that varies based on factors such as employee classification, coverage tier, or tenure. In the non-standard employer percentage the employer contributes a fixed percentage of the total benefit premium, with the employee paying the remaining balance. In the flat employer amount the employer pays a fixed dollar amount toward the benefit premium, regardless of the total cost or selected coverage tier. In the flat employee amount, the employee pays a fixed dollar amount for their benefits, with the employer covering any remaining cost.

GUI 300M illustrates an interface indicating the user of client device 111 has selected a particular plan (e.g., "Blue HMO 30") to adjust the contribution data for a particular benefit group 314. As illustrated, the benefit groups included are "intern-full time" and "benefits eligible." The interface also illustrates that the contribution strategy selected includes a flat employee amount. The parameters values for employee cost have been modified.

GUI 300N illustrates an interface that allows the user of client device 111 to save the contained IDO (e.g., worksheet or option) within the IDO (e.g., workbook). The GUIs of the workspace can permit the user of client device 111 to create and save one or more contained IDOs. In some embodiments, the IDO and/or the contained IDO can be published, which allows the subscriber entity to view (and possibly modify, in some embodiments) the IDO and/or contained IDO. GUI 300N illustrates the option to publish the contained IDO. Responsive to publishing, a notification can be sent to the subscriber entity indicating information pertaining to the IDO and/or contained IDO is ready for review.

Although not illustrated, in some embodiments SaaS management platform 120 can automatically generate one or more contained IDOs. In some embodiments, the SaaS management platform 120 can make assumptions for one or more user-defined parameter values for the configurable parameters to generate the auto-generated contained IDO.

For example and in some embodiments, an "as-is" auto-generated contained IDO can be created by mapping the same services (e.g., benefit plans) from the current year to the next year. The "as-is" auto-generated contained IDO can reflect a contained IDO where the subscriber entity 130 prefers to keep the same third-party service provider(s) as last year and the same contribution strategy. For instance, the same or similar benefit plans can be mapped between the current year and the next year (e.g., as described in the user-defined IDO data). The SaaS management platform 120 can assume the same contribution strategy (e.g., including amounts or percentage) for the next year as was elected in the current year (e.g., past year). The SaaS management platform 120 can use one or more of the third-party service provider's name(s) (e.g., carrier names), current year's services' names (e.g., benefit plan names), current year's plan information (e.g., IDO data such as employee elections) and current year's contribution strategy to generate the "as-is" auto-generated contained IDO. The SaaS management platform 120 can assume parameter values such as selected benefit plans and coverage types, enrollment percentage of each plan and distribution of enrollment into coverage tiers, contribution strategy and contribution amounts.

For example and in some embodiments, a "employer reduction" auto-generated contained IDO can be created by mapping the same services from the current year to the next year. The "employer reduction" auto-generated contained IDO can reflect a contained IDO where the subscriber entity prefers to keep the same third-party service provider(s) as last year and the same employee cost (and adjust the employers cost accordingly). The SaaS management platform 120 can use one or more of the third-party service provider name(s) (e.g., carrier names), current year's services' names (e.g., benefit plan names), current year's plan information (e.g., IDO data such as employee elections) and current year's contribution strategy (and amounts) to generate the "employer reduction plan" auto-generated contained IDO. The SaaS management platform 120 can assume parameter values such as selected benefit plans and component plans, enrollment percentage to each plan and distribution of enrollment into coverage tiers, contribution strategy and contribution amounts. The SaaS management platform 120 can assume the employee contribution (e.g., flat employee amount) is the same as the current year's contribution.

GUI 300O illustrates an interface of the end user device of subscriber entity. In an illustrative example, end user device associated with an end user can log in to a user account at SaaS management platform 120 to view the IDO. The interface can permit the end user to select any of the IDOs that have been published. Although only a single IDO is shown, any number of IDOs can be made available to the subscriber entity. The contained IDO(s) are made available within the IDO. A GUI (not shown) can also be provided once the IDO is selected to allow for the selection of one or more contained IDOs that are contained in the IDO.

GUI 300P illustrates an interface displayed at end user device that shows a summary view of contained IDO (e.g., "90-10"). The particular contained IDO has been selected and the summary is displayed. The summary can provide a detailed comparison of a current benefit plan and a proposed future benefit plan.

GUI 300Q also illustrates an interface displayed at end user device that shows a summary view of contained IDO (e.g., "90-10"). As illustrated, the comparison can be granular and include a comparison of one or more benefit components (e.g., coverage amount, who pays) between current coverage type and proposed future coverage type.

GUI 300R illustrates an interface displayed at end user device that permits the end user to duplicate (e.g., clone) a contained IDO. In some embodiments, the contained IDO can be a view only version and cannot be modified. In other embodiments, the contained IDO 141 can be modified by the end user. In some embodiments, the end user can duplicate the contained IDO to generate a duplicate contained IDO (e.g., "cloned 90-10") that permits the end user to modify configurable parameters and model different scenarios.

GUI 300S illustrates an interface displayed at end user device that permits the end user to modify parameter values of the duplicate contained IDO. As illustrated, the contribution data is modified for coverage tiers. In some embodiments, the GUIs that permit the modification of parameter values of contained IDOs presented to client device 111 (e.g., GUIs 300I through 300M) can be the same or similar to GUIs provided to end user device to modify parameter values of the duplicate contained IDO. For the sake of brevity, the GUIs displayed at the end user device are not reproduced here. It should be appreciated that the components and description provided for GUIs 300I through 300M of FIG. 3I through 3M can equally apply to the end user device GUIs for modifying configurable parameters of the duplicate contained IDO.

GUI 300T illustrates an interface displayed at end user device showing the contained IDOs of the IDO. The contained IDO includes contained IDO titled, "90-10" that was originally created and modified by client device and duplicate contained IDO titled, "Cloned—90-10" that was created and modified by end user device of subscriber entity. The GUI 300T allows the end user device to take an action on one or more of the contained IDOs. For example, the contained IDO "90-10" can be approved by the end user of end user device. If approved, a notification can be sent to client device indicating the subscriber entity approved the new services proposed in the contained IDO. The client device and/or client entity can initiate the new services, which may be facilitated by SaaS management platform 120 (e.g., SaaS management platform can provide the platform to manage the benefit plans for subscriber entity 130). In another example, the duplicate contained IDO "Cloned—90-10" may be sent to client entity for review. If client entity approves the duplicate contained IDO, the duplicate contained IDO can be sent to end user device for approval.

Methods 400A, 400B, 450A and 450B of FIGS. 4A-4D and/or each of the aforementioned method's individual functions, routines, subroutines, or operations can be performed by a processing device, having one or more processing units (CPU) (e.g., processing device) and memory devices communicatively coupled to the CPU(s). In some embodiments, the methods 400A, 400B, 450A and 450B can be performed by a single processing thread or alternatively by two or more processing threads, each thread executing one or more individual functions, routines, subroutines, or operations of the method. Methods 400A, 400B, 450A and 450B as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 400A, 400B, 450A and 450B are performed by IDO module 129 described in FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-3T may be used herein to help describe FIG. 4A-4D.

Figure 4A:
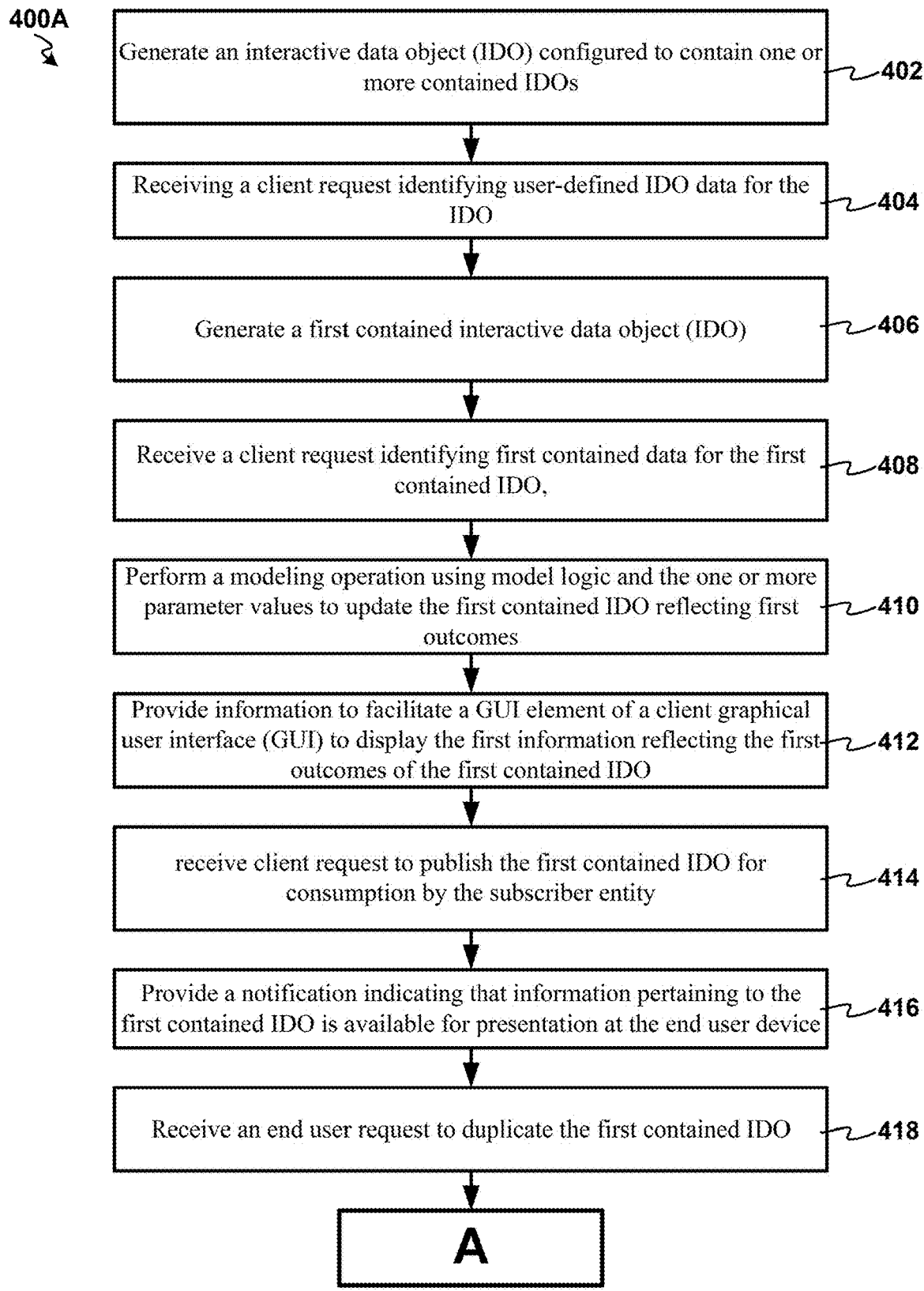
FIG. 4A-4B depict a flow diagram of example methods for collaborative modeling of outcomes for one or more new services, in accordance with some embodiments of the disclosure.
Figure 4B:
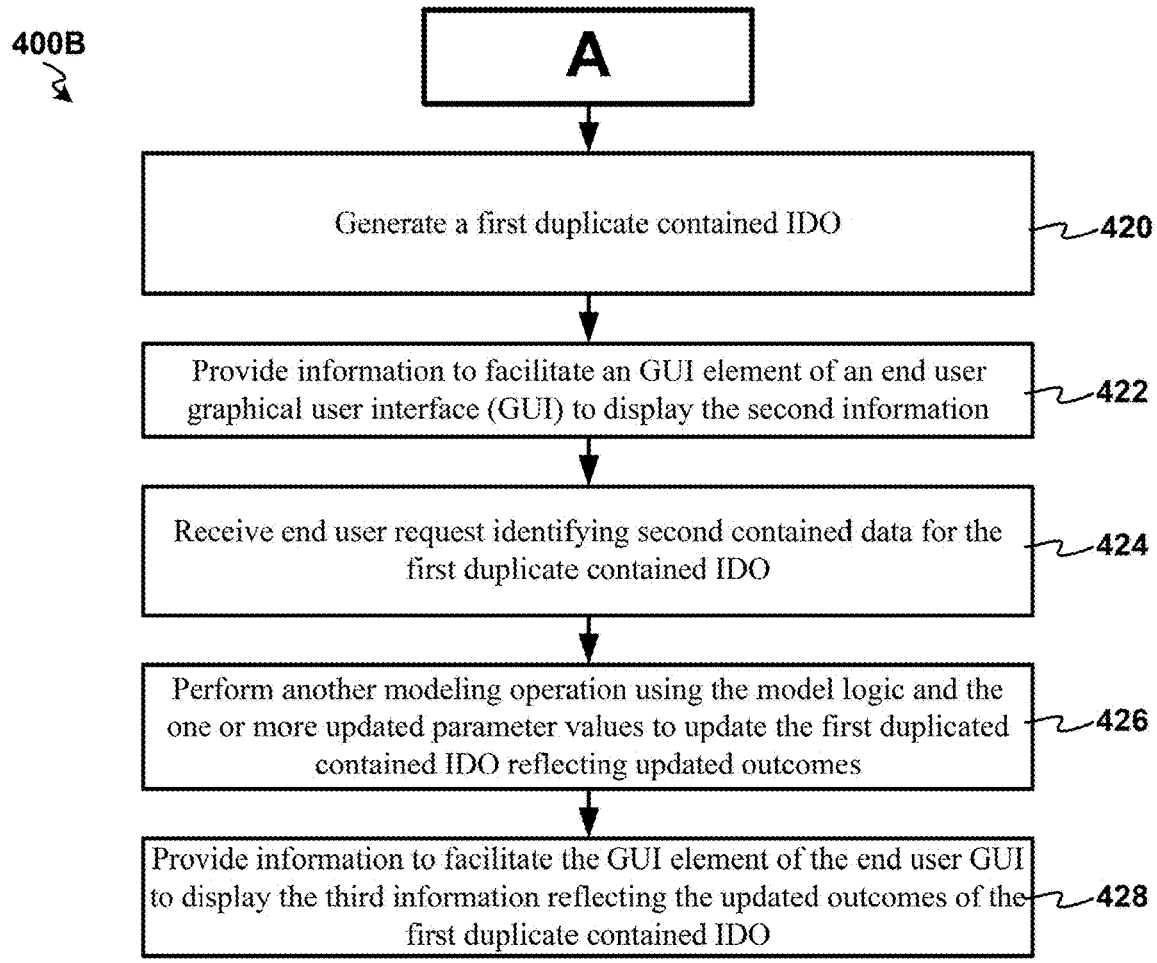

FIG. 4A-4B depict a flow diagram of example methods 400A and 400B for collaborative modeling of outcomes for one or more new services, in accordance with some embodiments of the disclosure. In some embodiments, method 400A and 400B can be performed by SaaS management platform 120, and in particular IDO module 129 of SaaS management platform 120.

At operation 402, processing logic generates an interactive data object (IDO) configured to contain one or more contained IDOs. In some embodiments, the SaaS management platform 120 generates the IDO. In some embodiments, the one or more contained IDOs include the first contained IDO. In some embodiments, the IDO is generated responsive to a client request from the client device.

At operation 404, processing logic receives a client request identifying user-defined IDO data for the IDO. In some embodiments, the SaaS management platform 120 receives the request from the client device via an API call. In some embodiments, the user-defined IDO data is related to the subscriber entity and one or more previous services consumed by the subscriber entity via the SaaS platform. In some embodiments, the user-defined IDO data identifies a relationship between one or more previous services consumed by the subscriber entity and one or more new services.

At operation 406, processing logic generates a first contained interactive data object (IDO). In some embodiments, the first contained IDO is generated by a software-as-a-service (SaaS) management platform. In some embodiments, the first contained IDO permits users to collaboratively model outcomes corresponding to one or more new services provided by one or more third-party service providers to a subscriber entity based on one or more configurable parameters. In some embodiments, the one or more new services are facilitated by the SaaS management platform. In some embodiments, the first contained IDO is generated in part using the user-defined IDO data.

At operation 408, processing logic receives a client request identifying first contained data for the first contained IDO. In some embodiments, the client request is received from a client device of a client entity via an API call. In some embodiments, a first client request identifies first contained data (e.g., user-defined contained data) for the first contained IDO. In some embodiments, the first contained data is related to the one or more new services for consumption by the subscriber entity. In some embodiments, the first contained data identifies user input identifying one or more parameter values of the one or more configurable parameters.

At operation 410, processing logic performs a modeling operation using model logic and the one or more parameter values to update the first contained IDO reflecting first outcomes. In some embodiments, the modeling operation is performed by SaaS management platform 120. In some embodiments, the first contained IDO is configured to derive data using the user-defined IDO data of the IDO and store the derived data without altering the user-defined IDO data of the IDO.

At operation 412, processing logic provides to the client device 111 information to facilitate a GUI element of a client graphical user interface (GUI) to display the first information reflecting the first outcomes of the first contained IDO.

In some embodiments, processing logic can generate a second contained IDO contained within the IDO. In some embodiments, the generation of the second contained IDO can be performed by SaaS management platform 120. In some embodiments, processing logic can receive from the client device via an API call a fourth client request identifying second contained data for the second contained IDO. In some embodiments, the second contained data includes additional user input identifying one or more alternative parameter values of the one or more configurable parameters.

At operation 414, processing logic receives a client request to publish the first contained IDO for consumption by the subscriber entity. In some embodiments, the client request (e.g., fifth request) is received from the client device.

At operation 416, processing logic provides a notification indicating that information pertaining to the first contained IDO is available for presentation at the end user device. In some embodiments, the notification is provided by the SaaS management platform 120 to an end user device 131. In some embodiments, the notification is provided responsive to the fifth client request.

At operation 418, processing logic receives a first end user request to duplicate the first contained IDO. In some embodiments, the first end user request is received from the end user device 131 and by the SaaS management platform 120.

Moving to method 400B of FIG. 3B, at operation 420, processing logic generates a first duplicate contained IDO. In some embodiments, the first duplicate contained IDO is generated responsive to the first end user request.

At operation 422, processing logic provides information to facilitate a GUI element of an end user graphical user interface (GUI) to display the second information. In some embodiments, the second information is provided to the end user device 131. In some embodiments, the second information reflects second outcomes of the first duplicate contained IDO. In some embodiments, the GUI is permits the modification of the one or more parameter values of the one or more configurable parameters.

At operation 424, processing logic receives an end user request (e.g., second end user request) identifying second contained data for the first duplicate contained IDO. In some embodiments, the second end user request is received from the end user device via an API call. In some embodiments, the second contained data includes updated user input identifying one or more updated parameter values of the one or more configurable parameters.

At operation 426, processing logic performs another modeling operation using the model logic and the one or more updated parameter values to update the first duplicate contained IDO reflecting updated outcomes. In some embodiments, the other modeling operation is performed by SaaS management platform 120.

At operation 428, processing logic provides, to the end user device 131, information to facilitate the GUI element of the end user GUI to display the third information reflecting the updated outcomes of the first duplicate contained IDO.

Figure 4C:
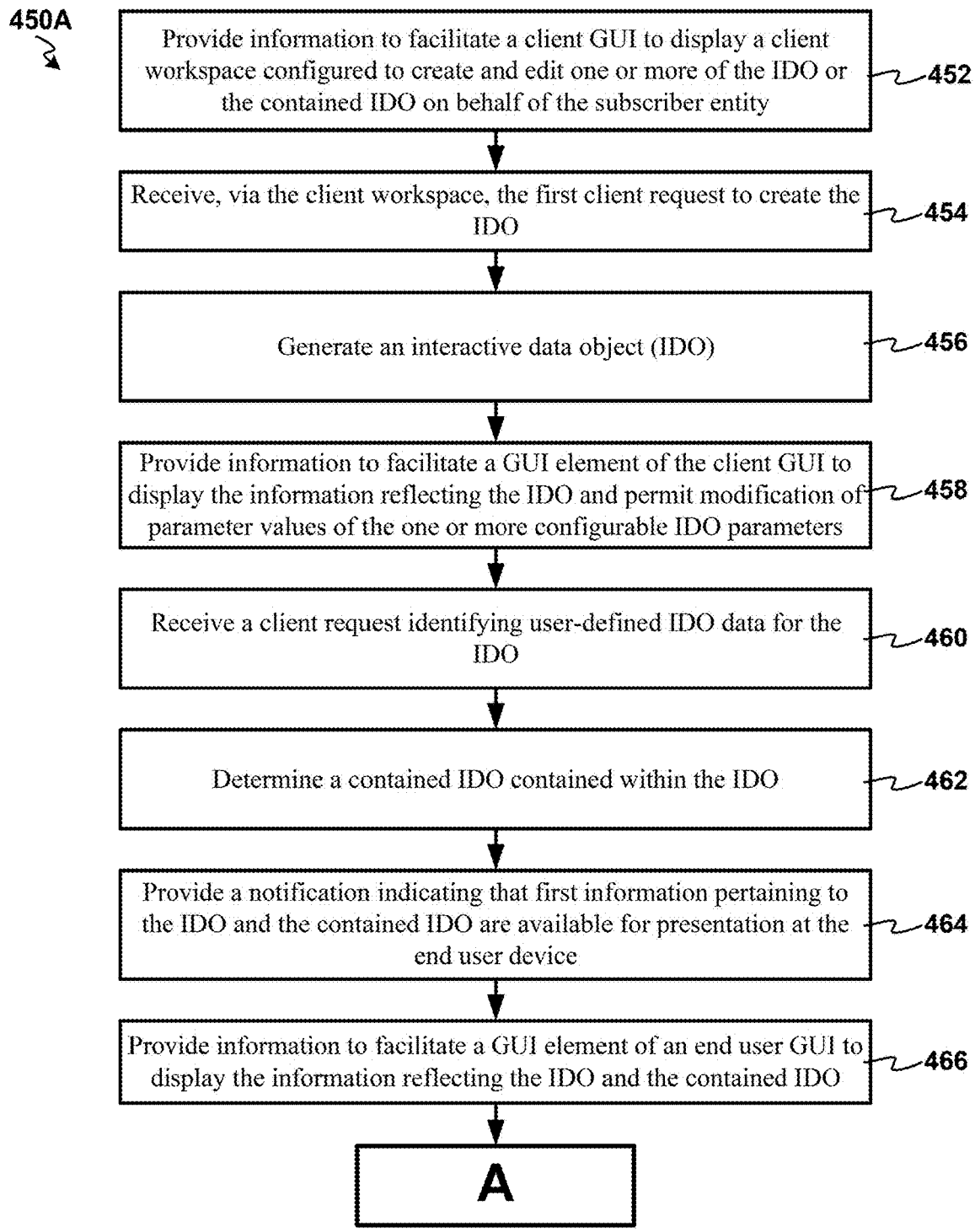
FIG. 4C-4D depict a flow diagram of example methods for end-to-end workflow for the collaborative modeling and evaluation of outcomes for one or more new services, in accordance with some embodiments of the disclosure.
Figure 4D:
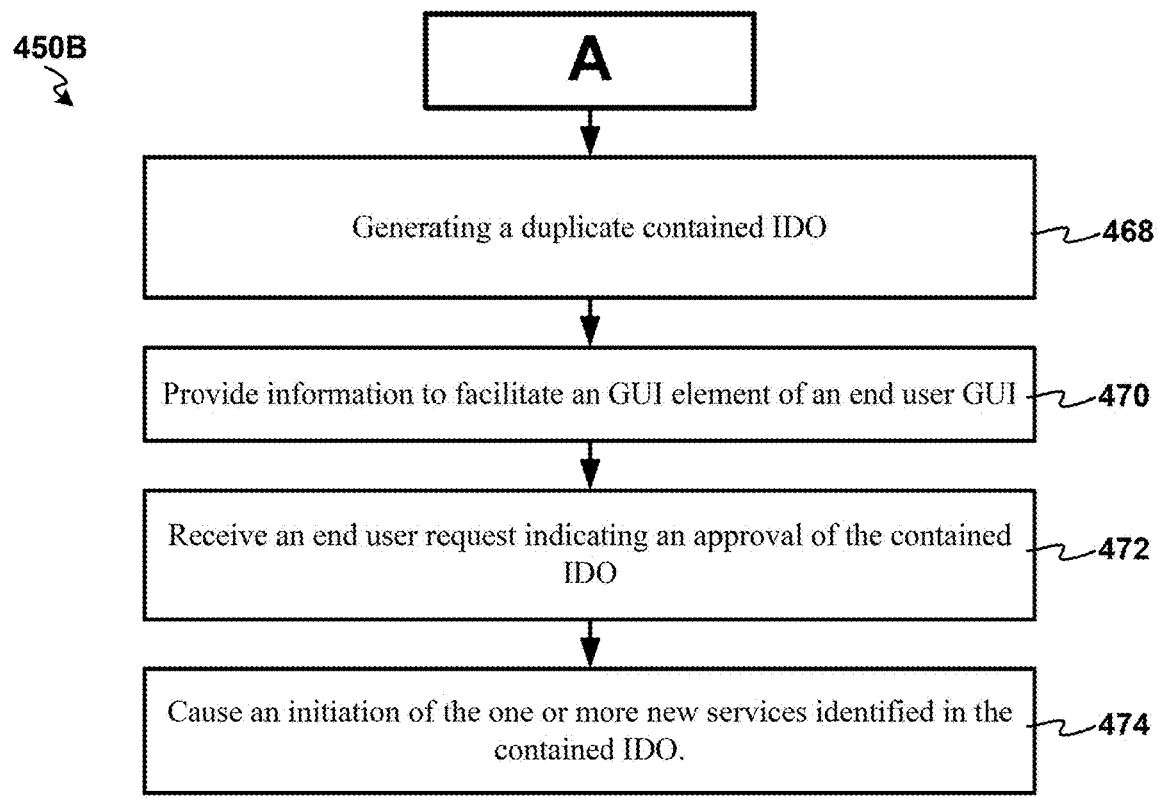

FIG. 4C-4D depict a flow diagram of example methods 450A and 450B for end-to-end workflow for the collaborative modeling and evaluation of outcomes for one or more new services, in accordance with some embodiments of the disclosure. In some embodiments, method 450A and 450B can be performed by SaaS management platform 120, and in particular IDO module 129 of SaaS management platform 120.

At operation 452, processing logic provide information to facilitate a client GUI to display a client workspace configured to create and edit one or more of the IDO or the contained IDO on behalf of the subscriber entity. In some embodiments, the information is provided by the SaaS platform and to the client device.

At operation 454, processing logic receives, via the client workspace, the first client request to create the IDO.

At operation 456, processing logic generates an interactive data object (IDO). In some embodiments, the IDO is generated by a software-as-a-service (SaaS) management platform responsive to a client request from a client device of a client entity. In some embodiments, the IDO is configured to contain one or more contained IDOs.

At operation 458, processing logic provides information to facilitate a GUI element of the client GUI to display the information reflecting the IDO and permit modification of parameter values of the one or more configurable IDO parameters. In some embodiments, the information is provided by the SaaS management platform 120.

At operation 460, processing logic receives a client request identifying user-defined IDO data for the IDO. In some embodiments, the client request is received from the client device via an application programming interface (API) call. In some embodiments, the user-defined IDO data is related to a subscriber entity and one or more previous services consumed by the subscriber entity via the SaaS management platform.

At operation 462, processing logic determines a contained IDO contained within the IDO. In some embodiments, determining the contained IDO contained within the IDO is based on the user-defined IDO data and contained data related to one or more new services for consumption by the subscriber entity. In some embodiments, the contained IDO is configured to model first outcomes corresponding to the one or more new services provided by one or more third-party services providers based on one or more parameters. In some embodiments, the one or more new services are facilitated by the SaaS management platform. In some embodiments, the contained IDO is configured to derive data using the user-defined IDO data of the IDO and store the derived data without altering the user-defined IDO data of the IDO.

In some embodiments, determining the contained IDO contained within the IDO based on the user-defined IDO data and the contained data, includes automatically generating the contained IDO based on second model logic that determines information pertaining to a relationship between the one or more previous services consumed by the subscriber entity and the one or more new services. In some embodiments, processing logic can make assumptions about one or more of the parameter values of the one or more parameter.

In some embodiments, determining the contained IDO contained within the IDO based on the user-defined IDO data and the contained data, includes receiving, from the client device, a client request identifying user-defined contained data comprising user input identifying one or more parameter values for the one or more parameters. In some embodiments, processing logic performs a modeling operation using first model logic the one or more parameter values to generate the contained IDO.

At operation 464, processing logic provides a notification indicating that first information pertaining to the IDO and the contained IDO is available for presentation at the end user device. In some embodiments, the notification is provided responsive to a client request from the client device to publish the IDO. In some embodiments the notification is provided by the SaaS management platform and to an end user device of the subscriber entity.

At operation 466, processing logic provides information to facilitate a GUI element of an end user GUI to display the information reflecting the IDO and the contained IDO. In some embodiments, the information is provided by the SaaS management platform to the end user device.

At operation 468, processing logic generates a duplicate contained IDO. In some embodiments, generating a duplicate contained IDO is responsive to a request from the end user device to duplicate the contained IDO.

At operation 470, processing logic provides information to facilitate a GUI element of an end user GUI. In some embodiments, the information is provided to the end user device. In some embodiments, the information is to facilitate a GUI element of an end user graphical user interface (GUI) to display the information reflecting second outcomes of the duplicate contained IDO and to permit user configuration of parameter values for the one or more parameters.

At operation 472, processing logic receives an end user request indicating an approval of the contained IDO. In some embodiments, the end user request is received from the end user device via the end user GUI.

At operation 474, processing logic causes an initiation of the one or more new services identified in the contained IDO. In some embodiments, causing an initiation of the one or more new services identified in the contained IDO is responsive to the receiving the end user request indicating the approval of the contained IDO.

Figure 5:
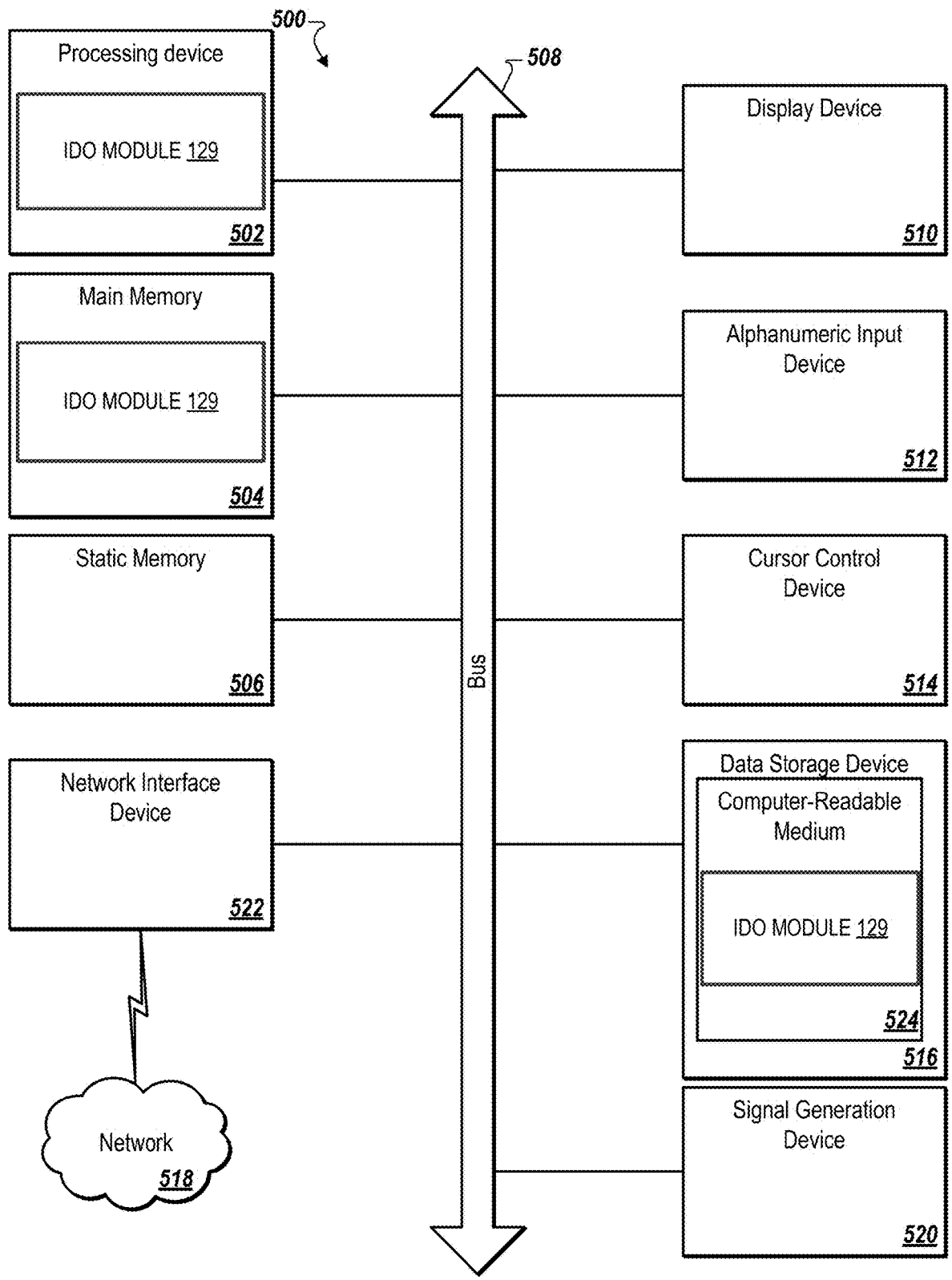
FIG. 5 is a block diagram illustrating an exemplary computer system, in accordance with an embodiment of the disclosure.

FIG. 5 is a block diagram illustrating an exemplary computer system 500, in accordance with an embodiment of the disclosure. The computer system 500 executes one or more sets of instructions that cause the machine to perform any one or more of the methodologies discussed herein. Set of instructions, instructions, and the like may refer to instructions that, when executed by computer system 500, cause computer system 500 to perform one or more operations of IDO module 129. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and IDO module 129 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 of IDO module 129 embodying any one or more of the methodologies or functions described herein. The sets of instructions of the system architecture 100 and of IDO module 129 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "receiving", "identifying", "determining", "causing", "performing" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising: generating, by a software-as-a-service (Saas) management platform, an interactive data object (IDO) responsive to a first client request from a client device of a client entity, the IDO configured to contain one or more contained IDOs;
   receiving, from the client device via an application programming interface (API) call, a second client request identifying user-defined IDO data for the IDO, the user-defined IDO data related to a subscriber entity and one or more previous services consumed by the subscriber entity via the SaaS management platform;
   determining a contained IDO contained within the IDO based on the user-defined IDO data and contained data related to one or more new services for consumption by the subscriber entity, the contained IDO configured to model first outcomes corresponding to the one or more new services provided by one or more third-party services providers based on one or more parameters, the one or more new services facilitated by the SaaS management platform;
   responsive to a third client request from the client device to publish the IDO, providing, by the SaaS management platform and to an end user device of the subscriber entity, a notification indicating that first information pertaining to the IDO and the contained IDO are available for presentation at the end user device,
   responsive to a request from the end user device to duplicate the contained IDO, generating a duplicate contained IDO;
   providing, to the end user device, second information to facilitate a first GUI element of an end user graphical user interface (GUI) to display the second information reflecting second outcomes of the duplicate contained IDO and to permit user configuration of parameter values for the one or more parameters;
   receiving, from the end user device via the end user GUI, an end user request indicating an approval of the contained IDO; and
   responsive to receiving the end user request indicating the approval of the contained IDO, causing an initiation of the one or more new services identified in the contained IDO.

2. The method of claim 1, wherein the contained IDO is configured to derive data using the user-defined IDO data of the IDO and store the derived data without altering the user-defined IDO data of the IDO.

3. The method of claim 1, further comprising: providing, by the SaaS management platform and to the end user device, third information to facilitate a second GUI element of the end user GUI to display the third information reflecting the IDO and the contained IDO.

4. The method of claim 1, wherein determining the contained IDO contained within the IDO based on the user-defined IDO data and the contained data, comprises: receiving, from the client device, a fourth client request identifying user-defined contained data comprising user input identifying one or more of the parameter values for the one or more parameters; and performing, by the SaaS management platform, a modeling operation using first model logic on the one or more parameter values to generate the contained IDO.

5. The method of claim 1, wherein determining the contained IDO contained within the IDO based on the user-defined IDO data and the contained data, comprises: automatically generating the contained IDO based on second model logic that determines fourth information pertaining to a relationship between the one or more previous services consumed by the subscriber entity and the one or more new services.

6. The method of claim 1, further comprising: providing, by the SaaS management platform and to the client device, fifth information to facilitate a client graphical user interface (GUI) to display a client workspace configured to create and edit one or more of the IDO or the contained IDO on behalf of the subscriber entity; and receiving, via the client workspace, the first client request to create the IDO.

7. The method of claim 6, further comprising: providing, by the SaaS management platform, sixth information to facilitate a GUI element of the client GUI to display the sixth information reflecting the IDO and permit modification of parameter values for one or more configurable IDO parameters.

8. A system comprising:
a memory; and
a processing device, coupled to the memory, configured to perform operations comprising:
generating, by a software-as-a-service (SaaS) management platform, an interactive data object (IDO) responsive to a first client request from a client device of a client entity, the IDO configured to contain one or more contained IDOs;
receiving, from the client device via an application programming interface (API) call, a second client request identifying user-defined IDO data for the IDO, the user-defined IDO data related to a subscriber entity and one or more previous services consumed by the subscriber entity via the SaaS management platform;
determining a contained IDO contained within the IDO based on the user-defined IDO data and contained data related to one or more new services for consumption by the subscriber entity, the contained IDO configured to model first outcomes corresponding to the one or more new services provided by one or more third-party services providers based on one or more parameters, the one or more new services facilitated by the SaaS management platform;
responsive to a third client request from the client device to publish the IDO, providing, by the SaaS management platform and to an end user device of the subscriber entity, a notification indicating that first information pertaining to the IDO and the contained IDO are available for presentation at the end user device responsive to a request from the end user device to duplicate the contained IDO, generating a duplicate contained IDO;
providing, to the end user device, second information to facilitate a first GUI element of an end user graphical user interface (GUI) to display the second information reflecting second outcomes of the duplicate contained IDO and to permit user configuration of parameter values for the one or more parameters;
receiving, from the end user device via the end user GUI, an end user request indicating an approval of the contained IDO; and
responsive to receiving the end user request indicating the approval of the contained IDO, causing an initiation of the one or more new services identified in the contained IDO.

9. The system of claim 8, wherein the contained IDO is configured to derive data using the user-defined IDO data of the IDO and store the derived data without altering the user-defined IDO data of the IDO.

10. The system of claim 8, the operations further comprising: providing, by the SaaS management platform and to the end user device, third information to facilitate a second GUI element of the end user GUI to display the third information reflecting the IDO and the contained IDO.

11. The system of claim 8, wherein determining the contained IDO contained within the IDO based on the user-defined IDO data and the contained data, comprises:
receiving, from the client device, a fourth client request identifying user-defined contained data comprising user input identifying one or more of the parameter values for the one or more parameters; and
performing, by the SaaS management platform, a modeling operation using first model logic on the one or more parameter values to generate the contained IDO.

12. The system of claim 8, wherein determining the contained IDO contained within the IDO based on the user-defined IDO data and the contained data, comprises: automatically generating the contained IDO based on second model logic that determines fourth information pertaining to a relationship between the one or more previous services consumed by the subscriber entity and the one or more new services.

13. The system of claim 8, the operations further comprising: providing, by the SaaS management platform and to the client device, fifth information to facilitate a client graphical user interface (GUI) to display a client workspace configured to create and edit one or more of the IDO or the contained IDO on behalf of the subscriber entity; and
receiving, via the client workspace, the first client request to create the IDO.

14. The system of claim 13, the operations further comprising: providing, by the SaaS management platform, sixth information to facilitate a GUI element of the client GUI to display the sixth information reflecting the IDO and permit modification of parameter values for one or more configurable IDO parameters.

15. A non-transitory computer-readable medium comprising instructions that, responsive to execution by a processing device, cause the processing device to perform operations comprising:
generating, by a software-as-a-service (SaaS) management platform, an interactive data object (IDO) responsive to a first client request from a client device of a client entity, the IDO configured to contain one or more contained IDOs;

receiving, from the client device via an application programming interface (API) call, a second client request identifying user-defined IDO data for the IDO, the user-defined IDO data related to a subscriber entity and one or more previous services consumed by the subscriber entity via the SaaS management platform;

determining a contained IDO contained within the IDO based on the user-defined IDO data and contained data related to one or more new services for consumption by the subscriber entity, the contained IDO configured to model first outcomes corresponding to the one or more new services provided by one or more third-party services providers based on one or more parameters, the one or more new services facilitated by the SaaS management platform;

responsive to a third client request from the client device to publish the IDO, providing, by the SaaS management platform and to an end user device of the subscriber entity, a notification indicating that first information pertaining to the IDO and the contained IDO are available for presentation at the end user device;

responsive to a request from the end user device to duplicate the contained IDO, generating a duplicate contained IDO;

providing, to the end user device, second information to facilitate a first GUI element of an end user graphical user interface (GUI) to display the second information reflecting second outcomes of the duplicate contained IDO and to permit user configuration of parameter values for the one or more parameters;

receiving, from the end user device via the end user GUI, an end user request indicating an approval of the contained IDO; and responsive to receiving the end user request indicating the approval of the contained IDO, causing an initiation of the one or more new services identified in the contained IDO.

16. The non-transitory computer-readable medium of claim 15, wherein the contained IDO is configured to derive data using the user-defined IDO data of the IDO and store the derived data without altering the user-defined IDO data of the IDO.

* * * * *